United States Patent
Kim et al.

(10) Patent No.: US 10,659,988 B2
(45) Date of Patent: May 19, 2020

(54) METHOD AND DEVICE FOR TRANSMITTING AND RECEIVING DATA IN MOBILE COMMUNICATION SYSTEM

(71) Applicant: Samsung Electronics Co., Ltd., Suwon-si (KR)

(72) Inventors: Soeng Hun Kim, Suwon-si (KR); Gert Jan Van Lieshout, Middlesex (GB); Sang Bum Kim, Suwon-si (KR); Kyeong In Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/601,833

(22) Filed: May 22, 2017

(65) Prior Publication Data

US 2017/0257792 A1    Sep. 7, 2017

Related U.S. Application Data

(63) Continuation of application No. 14/403,147, filed as application No. PCT/KR2013/004459 on May 21, 2013, now Pat. No. 9,661,526.

(60) Provisional application No. 61/658,617, filed on Jun. 12, 2012, provisional application No. 61/649,910, filed on May 21, 2012.

(51) Int. Cl.
   *H04W 28/02*    (2009.01)
   *H04W 74/08*    (2009.01)

(52) U.S. Cl.
   CPC ....... *H04W 28/0289* (2013.01); *H04W 74/08* (2013.01); *H04W 74/0833* (2013.01); *Y02D 70/124* (2018.01); *Y02D 70/126* (2018.01); *Y02D 70/14* (2018.01)

(58) Field of Classification Search
   CPC ................................................ H04W 28/0289
   See application file for complete search history.

(56) References Cited

U.S. PATENT DOCUMENTS

| | | |
|---|---|---|
| 5,898,681 A | 4/1999 | Dutta |
| 8,203,987 B2 | 6/2012 | Ishii et al. |

(Continued)

FOREIGN PATENT DOCUMENTS

| | | |
|---|---|---|
| CN | 1760836 A | 4/2006 |
| CN | 101496309 A | 7/2009 |

(Continued)

OTHER PUBLICATIONS

Communication from a foreign patent office in a counterpart foreign application, European Patent Office, "Communication pursuant to Article 94(3) EPC," Application No. EP 12839782.5, dated Jul. 24, 2018, 6 pages.

(Continued)

*Primary Examiner* — Chi H Pham
*Assistant Examiner* — Fahmida S Chowdhury

(57) ABSTRACT

The present specification relates to a communication method and a communication device, and a random access method of a user equipment (UE), according to one embodiment of the present specification, comprises the steps of: sensing a random access trigger in a connected state; determining the type of the random access trigger when the random access trigger is sensed; and performing congestion control if the type of the random access trigger is a preset type.

12 Claims, 19 Drawing Sheets

(56) References Cited

U.S. PATENT DOCUMENTS

| | | | |
|---|---|---|---|
| 8,649,288 B2 | 2/2014 | He et al. | |
| 9,237,419 B2 | 1/2016 | Jung et al. | |
| 2006/0085794 A1 | 4/2006 | Yokoyama | |
| 2007/0066329 A1 | 3/2007 | Laroia et al. | |
| 2008/0010677 A1* | 1/2008 | Kashima | H04L 1/1642 726/12 |
| 2008/0032662 A1 | 2/2008 | Tu | |
| 2008/0095116 A1* | 4/2008 | Kim | H04L 1/1841 370/331 |
| 2008/0123655 A1* | 5/2008 | Kim | H04L 1/1867 370/394 |
| 2008/0268852 A1* | 10/2008 | Petrovic | H04W 36/10 455/442 |
| 2009/0034476 A1* | 2/2009 | Wang | H04W 28/06 370/331 |
| 2009/0041246 A1 | 2/2009 | Kitazoe | |
| 2009/0103445 A1* | 4/2009 | Sammour | H04L 1/1812 370/252 |
| 2009/0149189 A1* | 6/2009 | Sammour | H04L 1/165 455/450 |
| 2009/0201948 A1* | 8/2009 | Patwardhan | H04W 28/065 370/474 |
| 2009/0232054 A1 | 9/2009 | Wang et al. | |
| 2009/0232118 A1 | 9/2009 | Wang et al. | |
| 2009/0238129 A1* | 9/2009 | Park | H04W 76/22 370/329 |
| 2009/0238142 A1* | 9/2009 | Chun | H04W 28/06 370/331 |
| 2009/0239525 A1 | 9/2009 | Cai et al. | |
| 2009/0316586 A1 | 12/2009 | Yi | |
| 2010/0093386 A1 | 4/2010 | Damnjanovic et al. | |
| 2010/0142485 A1* | 6/2010 | Lee | H04W 36/02 370/331 |
| 2010/0165937 A1* | 7/2010 | Yi | H04W 76/32 370/329 |
| 2010/0177831 A1 | 7/2010 | Kim et al. | |
| 2010/0189006 A1* | 7/2010 | Mallick | H04W 36/385 370/252 |
| 2010/0195524 A1 | 8/2010 | Iwamura | |
| 2010/0246491 A1 | 9/2010 | Bae et al. | |
| 2010/0265873 A1 | 10/2010 | Yi et al. | |
| 2010/0317356 A1 | 12/2010 | Roessel et al. | |
| 2010/0329452 A1* | 12/2010 | Alanara | H04L 9/065 380/44 |
| 2011/0038277 A1 | 2/2011 | Hu et al. | |
| 2011/0038313 A1* | 2/2011 | Park | H04W 28/065 370/328 |
| 2011/0051609 A1 | 3/2011 | Ishii et al. | |
| 2011/0075636 A1 | 3/2011 | Blomgren | |
| 2011/0085566 A1* | 4/2011 | Bucknell | H04L 47/10 370/412 |
| 2011/0134774 A1 | 6/2011 | Pelletier et al. | |
| 2011/0194505 A1 | 8/2011 | Faccin et al. | |
| 2011/0195668 A1 | 8/2011 | Lee et al. | |
| 2011/0201307 A1 | 8/2011 | Segura | |
| 2011/0222451 A1 | 9/2011 | Peisa et al. | |
| 2011/0250910 A1 | 10/2011 | Lee et al. | |
| 2011/0299415 A1 | 12/2011 | He et al. | |
| 2012/0039171 A1 | 2/2012 | Yamada et al. | |
| 2012/0044847 A1 | 2/2012 | Chang | |
| 2012/0044898 A1 | 2/2012 | Ishii | |
| 2012/0051297 A1 | 3/2012 | Lee et al. | |
| 2012/0108199 A1 | 5/2012 | Wang et al. | |
| 2012/0287836 A1 | 11/2012 | Lee et al. | |
| 2013/0045735 A1 | 2/2013 | Kim et al. | |
| 2013/0070682 A1 | 3/2013 | Kim et al. | |
| 2013/0109320 A1 | 5/2013 | Tomala et al. | |
| 2013/0114579 A1 | 5/2013 | Vujcic | |
| 2014/0023032 A1 | 1/2014 | Kim et al. | |
| 2014/0242974 A1 | 8/2014 | Lee et al. | |
| 2014/0294179 A1* | 10/2014 | Sammour | H04W 80/02 380/270 |
| 2015/0009959 A1* | 1/2015 | Uchino | H04W 36/04 370/331 |
| 2017/0195020 A1 | 7/2017 | Ko et al. | |

FOREIGN PATENT DOCUMENTS

| | | |
|---|---|---|
| CN | 101682896 A | 3/2010 |
| CN | 101841889 A | 9/2010 |
| EP | 2265077 A1 | 12/2010 |
| EP | 2410670 A2 | 1/2012 |
| EP | 2849369 A1 | 3/2015 |
| EP | 2849501 A1 | 3/2015 |
| KR | 10-2009-0039813 A | 4/2009 |
| KR | 10-2010-0106890 A | 10/2010 |
| KR | 10-2010-0126509 A | 12/2010 |
| KR | 10-2010-0133477 A | 12/2010 |
| KR | 10-2010-0137507 A | 12/2010 |
| KR | 10-2010-0137531 A | 12/2010 |
| KR | 20110093642 A | 8/2011 |
| KR | 10-2011-0109992 A | 10/2011 |
| KR | 10-2011-0113484 A | 10/2011 |
| KR | 10-2012-0034159 A | 4/2012 |
| RU | 2009120480 A | 12/2010 |
| WO | 2008/024788 A2 | 2/2008 |
| WO | 2010125969 A1 | 11/2010 |
| WO | 2011020002 A1 | 2/2011 |
| WO | 2011038272 A1 | 3/2011 |
| WO | 2011/099725 A2 | 8/2011 |
| WO | 2011093666 A2 | 8/2011 |
| WO | 2011100492 A1 | 8/2011 |
| WO | 20110139088 A2 | 11/2011 |
| WO | 2011/157292 A1 | 12/2011 |
| WO | 20110155784 A2 | 12/2011 |
| WO | 2012-008691 A2 | 1/2012 |
| WO | 2012/108811 A1 | 8/2012 |
| WO | 2012-141483 A2 | 10/2012 |
| WO | 2013-051836 A1 | 4/2013 |
| WO | 2013-051912 A2 | 4/2013 |
| WO | 2013-065995 A2 | 5/2013 |

OTHER PUBLICATIONS

Communication from a foreign patent office in a counterpart foreign application, Korean Intellectual Property Office, "Office Action," Application No. KR 10-2014-7012797, dated Sep. 7, 2018, 9 pages.
Samsung, "Discussion on CQI/SRS transmission during DRX," Tdoc R2-114180, 3GPP TSG-RAN2 #75 Meeting, Aug. 22-26, 2011, Athens, Greece, 5 pages.
"3rd Generation Partnership Project; Technical Specification Group Radio Access Network Extending 850MHz Study Item Technical Report (Release 9)," 3GPP TR 37.806, V1.1.0, Aug. 2011, 77 pages.
"3rd Generation Partnership Project; Technical Specification Group Radio Access Network; Universal Terrestrial Radio Access (UTRA) and Evolved Universal Terrestrial Radio Access (E-UTRA); Radio Measurement Collection for Minimization of Drive Tests (MDT); Overall Description; Stage 2 (Release 10)," 3GPP TS 37.320, V10.4.0, Dec. 2011, 18 pages.
"Multiple Frequency Band Indicators per Cell," 3GPP TSG-RAN WG2 #75, Tdoc R2-114299, Ericsson and ST Ericsson, Athens, Greece, Aug. 22-26, 2011, 5 pages.
"The MDT Applicability of EPLMN," 3GPP TSG-WG2 Meeting #75, R2-114011, Huawei and HiSilicon, Athens, Greece, Aug. 22-26, 2011, 16 pages.
"Support for UE Assistance Information for eDDA," 3GPP TSG RAN WG2 Meeting #77bis, R2-121746, Intel Corporation, Jeju, Korea, Mar. 26-30, 2012, 5 pages.
"About DRX Configuration and UE Assistance," 3GPP TSG-RAN WG2 #78, Tdoc R2-122587, Ericsson, ST-Ericsson, Prague, Czech Republic, May 21-25, 2012, 7 pages.
Foreign Communication From a Related Counterpart Application, Australian Application No. 2013208385, Examination Report No. 3 for Standard Patent Application dated Dec. 21, 2016, 6 pages.

(56) References Cited

OTHER PUBLICATIONS

Foreign Communication From a Related Counterpart Application, Chinese Application No. 201280040843.3, Text of the First Office Action dated Dec. 8, 2016, 17 pages.
Foreign Communication From a Related Counterpart Application, Chinese Application No. 201380042871.3, Text of the First Office Action dated Jan. 6, 2017, 19 pages.
Foreign Communication From a Related Counterpart Application, Chinese Application No. 201380036294.7, Text of the First Office Action dated Feb. 4, 2017, 12 pages.
Foreign Communication From a Related Counterpart Application, Russian Application No. 2014127861, Decision on Grant dated Nov. 28, 2016, 13 pages.
European Patent Office, "Supplementary European Search Report," Application No. 13793409.7-1870, dated Feb. 1, 2016, 8 pages, publisher EPO, Munich, Germany.
Interdigital Communications, "Handling of SCell Activation/Deactivation RF Retuning Interruptions," R2-122289, 3GPP TSG RAN WG2 #78, Prague, Czech Republic, May 21-25, 2012, 13 pages.
Renesas Mobile Europe Ltd, "Considerations on retuning interruptions," R4-123056, 3GPP TSG-RAN WG4 Meeting #63, Prague, Czech Republic, May 21-25, 2012, 5 pages.
International Search Report dated Sep. 25, 2013 in connection with International Patent Application No. PCT/KR2013/004459, 3 pages.
Written Opinion of International Searching Authority dated Sep. 25, 2013 in connection with International Patent Application No. PCT/KR2013/004459, 6 pages.
3GPP TS 36.311 V10.5.0, "3rd Generation Partnership Project; Technical Specification Group Radio Access Network; Evolved Universal Terrestrial Radio Access (E-UTRA); Radio Resource Control (RRC); Protocol Specification (Release 10)", Mar. 2012, 310 pages.
Ericsson et al.; "Accessibility Measurements for MDT"; 3GPP TSG-RAN WG2 #76; R2-116148; Sari Francisco, California, USA; Oct. 14-18, 2011; 2 pages.
"3rd Generation Partnership Project; Technical Specification Group Radio Access Network; Study on Minimization of drive-tests in Next Generation Networks; (Release 9)"; 3GPP TR 36.805 V9.0.0; Dec. 2009; 40 pages.
Foreign Communication from Related Counterpart Application; Chinese Patent Application No. 201360010349.7; First Chinese Office Action dated May 31, 2017; 14 pages.
Foreign Communication from Related Counterpart Application; Japanese Patent Application No. 2014-551202; Japanese Notice of Reasons for Refusal dated Jun. 5, 2017; 6 pages.
Office Action dated Sep. 5, 2017 in connection with Chinese Patent Application No. 2013800240263.
Communication from a foreign patent office in a counterpart foreign application, Australian Government IP Australia, Examination report No. 1 for standard patent application, Application No. AU 2017203059, dated Jun. 5, 2018, 8 pages.
Communication from a foreign patent office in a counterpart foreign application, Canadian Intellectual Property Office, Office Action, Application No. CN 2,845,779, dated Jun. 7, 2018, 4 pages.
Communication from a foreign patent office in a counterpart foreign application, European Patent Office, "Communication pursuant to Article 94(3) EPC," Application No. EP 12826373.8, dated Apr. 13, 2018, 7 pages.
Ericsson, et al., "Multiple frequency band indicators per cell," R2-114301, 3GPP TSF-RAN2 Meeting #75, Athens, Greece, Aug. 22-26, 2011, 8 pages.
"23.1 RRC Connection Establishment," Long Term Evolution (LTE), www.lte-bullets.com, published Aug. 12, 2011 per WayBack Machine, 4 pages.
3GPP TS 36.101, V10.3.0 (Jun. 2011), Technical Specification, 3rd Generation Partnership Project; Technical Specification Group Radio Access Network; Evolved Universal Terrestrial Radio Access (E-UTRA); User Equipment (UE) radio transmission and reception (Release 10), Jun. 21, 2011, 237 pages, XP050553331.

Korean Intellectual Patent Office, "Office Action," Application No. KR 10-2013-0050776, dated Mar. 6, 2019, 9 pages.
Korean Intellectual Patent Office, "Office Action," Application No. KR 10-2013-0051929, dated May 1, 2019, 14 pages.
3GPP TS 36.331 V10.5.0 (Mar. 2012), Technical Specification, 3rd Generation Partnership Project; Technical Specification Group Radio Access Network; Evolved Universal Terrestrial Radio Access (E-UTRA); Radio Resource Control (RRC); Protocol specification (Release 10), Mar. 2012, 302 pages.
Samsung, "On the reporting the failed RRC connection establishment," R2-121272, 3GPP TSG RAN WG2 #77bis, Marcy 26-30, 2012, Jeju Island, Korea, 4 pages.
Intellectual Property India, "Examination report under sections 12 & 13 of the Patents Act, 1970 and the Patents Rules, 2003," Application No. IN 2519/KOLNP/2014, dated Nov. 27, 2018, 5 pages.
Korean Intellectual Property Office, "Office Action," Application No. KR 10-2013-0002595, dated Jan. 3, 2019, 11 pages.
3GPP TS 36.331 V10.4.0 (Dec. 2011), Technical Specification, 3rd Generation Partnership Project; Technical Specification Group Radio Access Network; Evolved Universal Terrestrial Radio Access (E-UTRA); Radio Resource Control (RRC); Protocol specification (Release 10), Dec. 2011, 296 pages.
European Patent Office, "European Search Report," Application No. EP 19184016.4, dated Oct. 7, 2019, 10 pages.
Intellectual Property India, "Examination report under section 12 & 13 of the Patents Act, 1970 and the Patents Rules, 2003," Application No. IN 3851/KOLNP/2013, dated Sep. 18, 2019, 8 pages.
Korean Intellectual Property Office, "Office Action," Application No. KR 10-2012-0113330, dated Sep. 4, 2019, 9 pages.
Korean Intellectual Property Office, "Decision of Patent," Application No. KR 10-2013-0002595, dated Sep. 5, 2019, 7 pages.
Korean Intellectual Property Office, "Decision of Patent," Application No. KR 10-2013-0051929, dated Oct. 24, 2019, 8 pages.
Catt, et al, "Frame and SFN timing in CA," R2-103521, 3GPP TSG RAN WG2 Meeting #70bis, Stockholm, Sweden, Jun. 28-Jul. 2, 2010, 2 pages.
Ericsson, et al., "CSI and SRS reporting at unexpected DRX state change," Tdoc R2-114033, 3GPP TSG-RAN WG2 #75, Athens, Greece, Aug. 22-26, 2011, 5 pages.
Huawei, et al, "Signalling for the TA Group Management," R2-115827, 3GPP TSG-RAN WG2 Meeting #76, San Francisco, USA, Nov. 14-18, 2011, 4 pages.
Huawei, et al, "Consideration on coverage optimization," R2-115885, 3GPP TSG-RAN WG2 Meeting #76, San Francisco, USA, Nov. 14-18, 2011, 2 pages.
Nokia Siemens Networks, et al, "Clarification on CQI/SRS reporting during DRX," R2-114021, 3GPP TSG-RAN WG2 #75, Athens, Greece, Aug. 22-26, 2011, 3 pages.
ETSI TS 137 320 V10.1.0 (Apr. 2011), Technical Specification, Universal Mobile Telecommunications System (UMTS); LTE; Universal Terrestrial Radio Access (UTRA) and Evolved Universal Terrestrial Radio Access (E-UTRA); Radio measurement collection for Minimization of Drive Tests (MDT); Overall description; Stage 2 (3GPP TS 37.320 version 10.1.0 Release 10), Apr. 2011, 19 pages.
Office Action dated Jun. 6, 2019 in connection with Canadian Patent Application No. 2,859,499, 4 pages.
European Search Report dated Jul. 3, 2019 in connection with European Patent Application No. 19 16 5270, 10 pages.
European Search Report in connection with European Application No. 19206062.2 dated Feb. 7, 2020, 11 pages.
Office Action in connection with Korean Application No. 10-2014-7031376 dated Feb. 4, 2020, 8 pages.
Office Action in connection with Korean Application No. 10-2012-0113330 dated Feb. 26, 2020, 8 pages.
Decision of Patent in connection with Korean Application No. 10-2012-0087076 dated Feb. 26, 2020, 8 pages.
Office Action in connection with Korean Application No. 10-2014-7031585 dated Feb. 4, 2020, 11 pages.
Alcatel-Lucent, "Report of Email discussion on [68b#21] LTE: 36.331 CR for "full configuration"," Draft R2-101376, 3GPP TSG RAN WG2 #69, San Francisco, USA, Feb. 22-26, 2010, 4 pages.

(56) References Cited

OTHER PUBLICATIONS

Nokia Siemens Networks, et al, "PDCP SN extension in Rel-11," R2-123432, 3GPP TSG-RAN WG2 Meeting #79, Qingdao, China, Aug. 13-17, 2012, 4 pages.

Rapporteur (Ericsson), "UE soft buffer handling in MAC," R2-115078, 3GPP TSG-RAN2 WG2 Meeting #75bis, Zhuhai, China, Oct. 10-14, 2011, 5 pages.

* cited by examiner

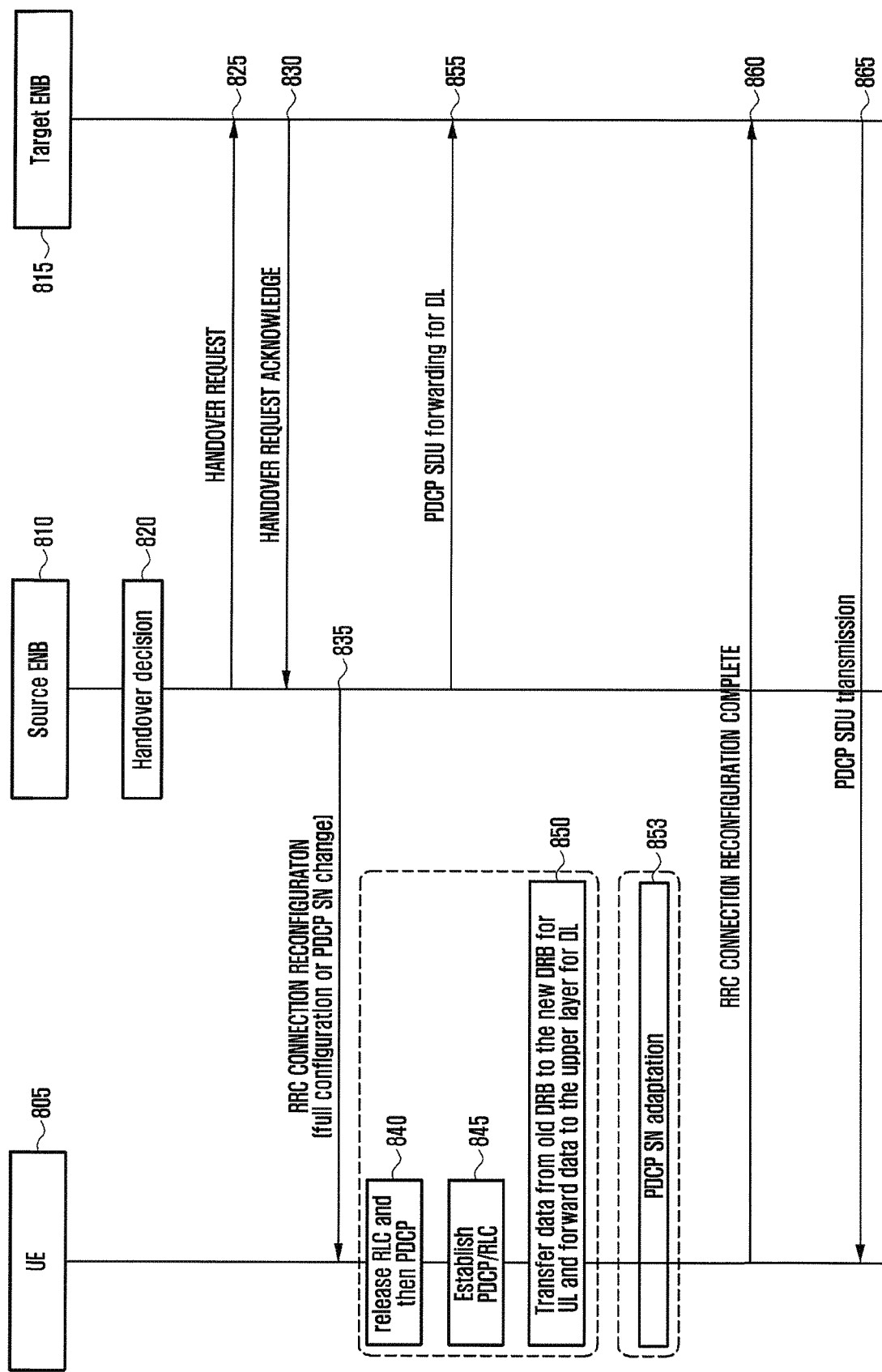

METHOD AND DEVICE FOR TRANSMITTING AND RECEIVING DATA IN MOBILE COMMUNICATION SYSTEM

CROSS-REFERENCE TO RELATED APPLICATION(S)

The present application is a continuation of U.S. patent application Ser. No. 14/403,147 filed on Nov. 21, 2014, which claims priority under 35 U.S.C. § 365 to International Patent Application No. PCT/KR2013/004459 filed May 21, 2013, entitled "METHOD AND DEVICE FOR TRANSMITTING AND RECEIVING DATA IN MOBILE COMMUNICATION SYSTEM", International Patent Application No. PCT/KR2013/004459 claims priority under 35 U.S.C. § 365 and/or 35 U.S.C. § 119(e) to U.S. Provisional Patent Application No. 61/658,617 filed Jun. 12, 2012, and United States Provisional Patent Application No. 61/649,910 filed May 21, 2012, which are incorporated herein by reference into the present disclosure as if fully set forth herein.

TECHNICAL FIELD

The present invention relates to a method and apparatus for transmitting and receiving data in the mobile communication system.

BACKGROUND ART

Mobile communication systems were developed to provide mobile users with communication services. With the rapid advance of technologies, the mobile communication systems have evolved to the level capable of providing high speed data communication service beyond the early voice-oriented services.

Recently, standardization for a Long Term Evolution (LTE) system, as one of the next-generation mobile communication systems, is underway in the $3^{rd}$ Generation Partnership Project (3GPP). LTE is a technology for realizing high-speed packet-based communications with the data rate of up to 100 Mbps, which is higher than the currently available data rate, and its standardization is almost complete.

In line with the completion of the LTE standardization, an LTE-Advanced (LTE-A) system is now under discussion, which improves a transfer rate by combining the LTE communication system with several new technologies. One of such technologies is Carrier Aggregation. The Carrier Aggregation is a technology allowing a terminal to use multiple downlink carriers and multiple uplink carriers unlike the conventional technology of using one downlink carrier and one uplink carrier for data communication.

Assuming that a cell is configured with one downlink carrier and one uplink carrier in the conventional concept, the carrier aggregation can be understood as if the UE communicates data via multiple cells. With the use of carrier aggregation, the peak data rate increases in proportion to the number of aggregated carriers.

In the following description, if a UE receives data through a certain downlink carrier or transmits data through a certain uplink carrier, this means to receive or transmit data through control and data channels provided in cells corresponding to center frequencies and frequency bands characterizing the carriers.

In the present Invention, carrier aggregation may be expressed as configuring a plurality of serving cells. At this time, the plurality serving cells include a primary serving cell (PCell) and secondary serving cell (SCell).

Other terms to describe the embodiments of the present invention are used in the meanings as used in the LTE system and specified in TS36.331 and TS36.321 (December, 2011).

In line with the widespread use of smartphone an always-on type services, the number of terminals in connected state increases and, as a consequence, this increases the probability of congestion on the random access channel. An embodiment of the present invention proposes a method and apparatus for applying congestion control to the terminal in the connected state to solve the above problem.

As aforementioned, the introduction of the carrier aggregation increases the achievable data rate dramatically, it is restrictive to increase the data rate actually doe to the intrinsic problem of layer 2 (e.g. short length of sequence number). An embodiment of the present invention proposes a method and apparatus to extend the layer sequence number.

DISCLOSURE OF INVENTION

Technical Problem

The present invention aims to provide a method and apparatus of preventing occurrence of cell congestion.

Solution to Problem

In accordance with an aspect of the present invention, a random access method of a User Equipment (UE) includes detecting a random access trigger in a connected state, checking a type of the random access trigger, performing, when the random access trigger is a predetermined type, congestion control.

In accordance with another aspect of the present invention, a User Equipment (UE) which performs random access includes a controller which detects a random access trigger in a connected state, checks a type of the random access trigger, and performs, when the random access trigger is a predetermined type, congestion control.

In accordance with another aspect of the present invention, a communication method of a base station includes broadcasting congestion control information for use in a random access procedure of a User Equipment (UE) in a connected state. The congestion control information includes a threshold value to be compared with a value generated randomly for determining whether the UE in the connected state performs the random access procedure for uplink transmission.

In accordance with still another aspect of the present invention, a base station includes a communication unit which broadcasts congestion control information for use in a random access procedure of a User Equipment (UE). The congestion control information includes a threshold value to be compared with a value generated randomly for determining whether the UE in the connected state performs the random access procedure for uplink transmission.

Advantageous Effects of Invention

The method and apparatus of the present invention is advantageous in terms of preventing occurrence of cell congestion.

BRIEF DESCRIPTION OF DRAWINGS

FIG. 8 is a signal flow diagram illustrating the handover procedure according to the third embodiment of the present invention.

MODE FOR THE INVENTION

A detailed description is made of the representative embodiments to achieve the above technical objects. The same reference numbers are used throughout the drawings to refer to the same or like parts. However, the present invention is not limited by the terms used for explanation convenience but can be even to other systems having the similar technical background with a slight modification, without departing from the spirit and scope of the present invention.

Exemplary embodiments of the present invention are described in detail hereinafter with reference to the accompanying drawings.

Figure 1:
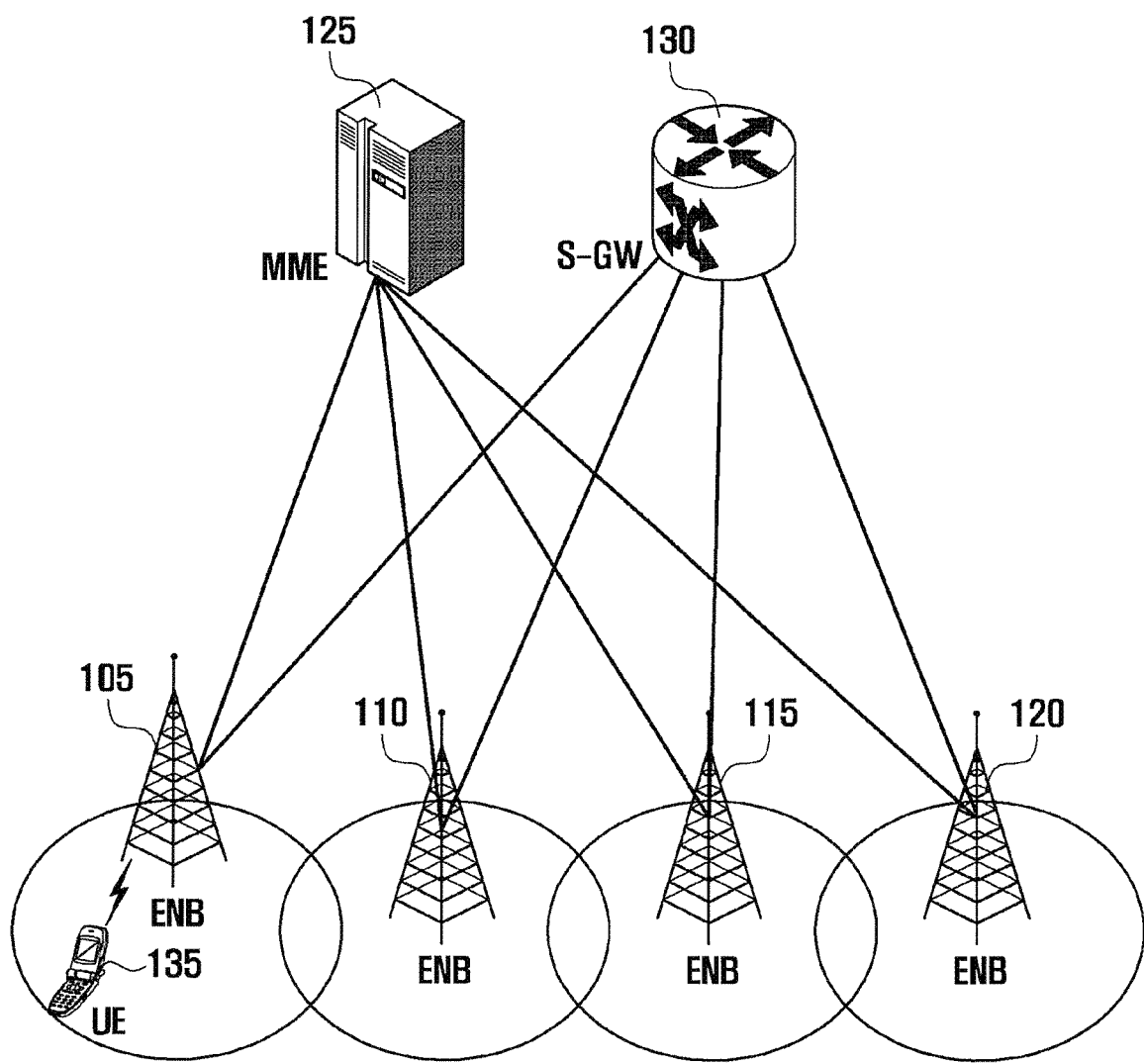
FIG. 1 is a diagram illustrating LTE system architecture to which various embodiments of the present disclosure are applied.

FIG. 1 is a diagram illustrating LTE system architecture to which various embodiments of the present disclosure are applied.

Referring to FIG. 1, the radio access network of the mobile communication system includes evolved Node Bs (eNBs) 105, 110, 115, and 120, a Mobility Management Entity (MME) 125, and a Serving-Gateway (S-GW) 130. The User Equipment (hereinafter, referred to as UE) 135 connects to an external network via eNBs 105, 110, 115, and 120 and the S-GW 130.

The eNBs 105, 110, 115, and 120 are connected to the UE 135 through radio channels. The eNBs 105, 110, 115, and 120 allow correspond to the legacy node Bs of the UMTS system but are responsible for complicated functions as compared to the legacy node B In an exemplary LTE system, all the user traffic including real time services such as Voice over Internet Protocol (VoIP) are provided through a shared channel.

Accordingly, there is a need of a device for scheduling data based on the state information such as buffer states, power headroom states, and channel states of the UEs; and the eNBs 105, 110, 115, and 120 are responsible for the function. Particularly, the LTE system adopts Orthogonal Frequency Division Multiplexing (OFDM) as a radio access technology to secure the data rate of up to 100 Mbps.

The UE 135 uses Adaptive Modulation & Coding (AMC). AMC is a technology of determining the modulation scheme and channel coding rate in adaptation to the channel condition.

The S-GW 130 is an entity to provide data bearers so as to establish and release data bearers under the control of the MME 125. The MME 125 is responsible for mobility management of UEs and various control functions and may be connected to a plurality of eNBs.

Figure 2:
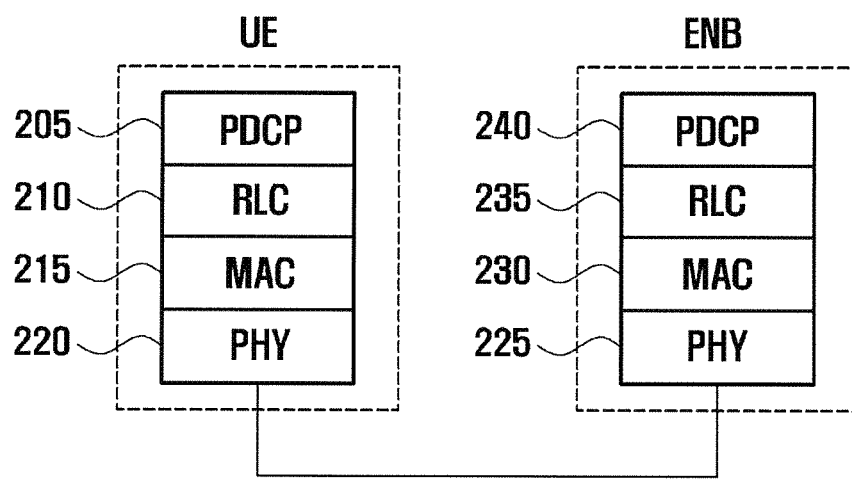
FIG. 2 is a diagram illustrating a protocol stack of the LTE system to which the present invention is applied.

FIG. 2 is a diagram illustrating a protocol stack of the LTE system to which the present invention is applied.

Referring to FIG. 2, the protocol stack of the LTE system includes Packet Data Convergence Protocol (PDCP) 205 and 240, Radio Link Control (RLC) 210 and 235, Medium Access Control (MAC) 215 and 230, and Physical (PHY) 220 and 225.

The PDCP layer 205 and 240 is responsible for IP header compression/decompression. The RLC layer 210 and 235 is responsible for segmenting the PDCP Protocol Data Unit (PDU) into segments in appropriate size for Automatic Repeat Request (ARQ) operation.

The MAC layer 215 and 230 is responsible for establishing connection to a plurality of RLC entities. The MAC layer 215 and 230 multiplexes the RLC PDUs into MAC PDUs and delivers the MAC PDUs to the PHY layer 220 and 25. The MAC layer 215 and 230 also demultiplexes the MAC PDUs from the PHY layers 220 and 225 into RLC PDUs and delivers the RLC PDUs to the RLC entities.

The PHY layer 220 and 225 performs channel coding and modulation on the upper layer data to generate OFDM symbols and transmit the OFDM symbols over radio channel. The PHY layer 220 and 225 performs demodulation and channel decoding on the OFDM symbols received over the radio channel and deliver the decoded data to the upper layer.

Figure 3:
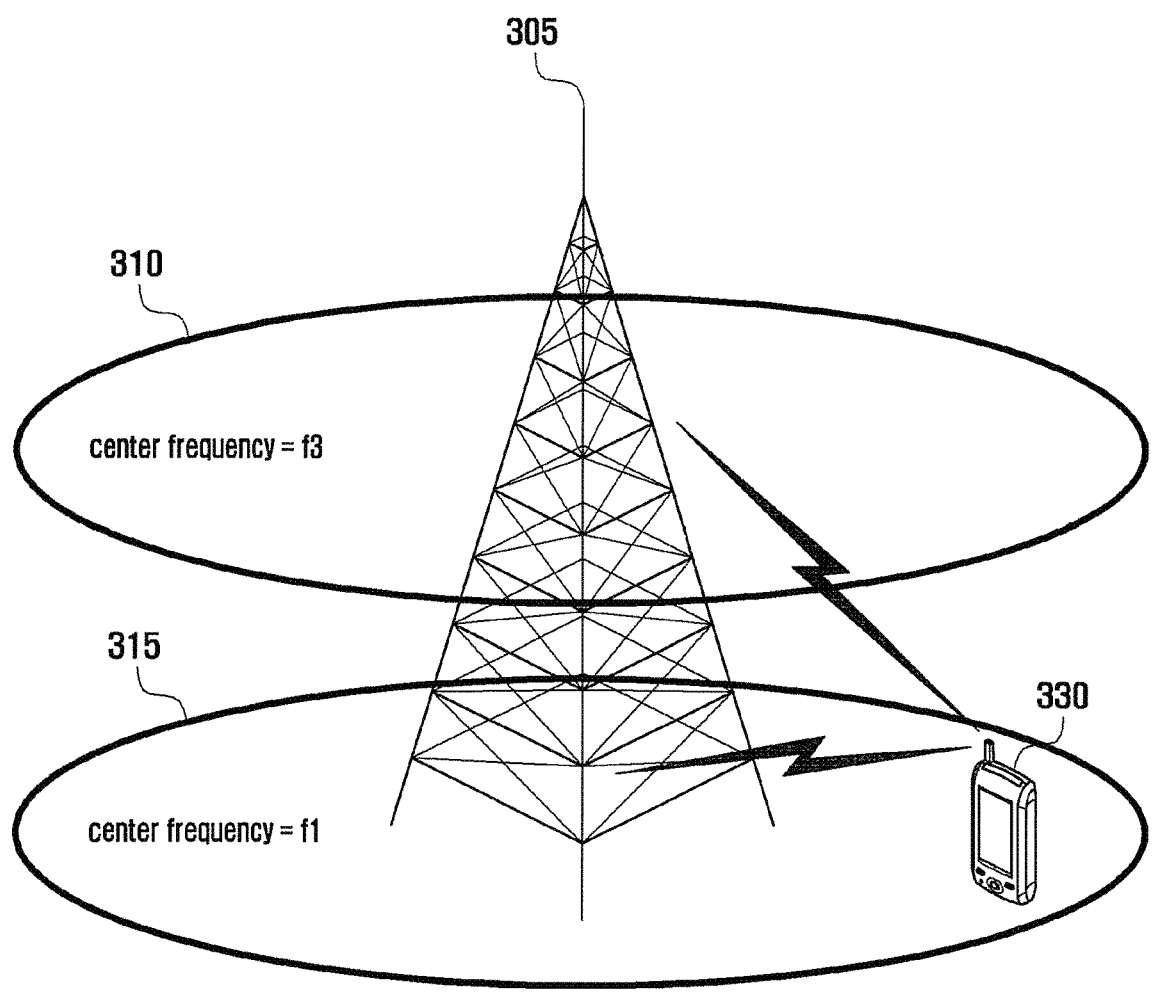
FIG. 3 is a diagram illustrating intra-eNB carrier aggregation.

FIG. 3 is a diagram illustrating intra-eNB carrier aggregation.

Referring to FIG. 3, an eNB transmits and receives signals to and from the UE 330 through multiple carriers across a plurality of frequency bands.

For example, it is typical for the eNB 305 using multiple carriers having downlink center frequency f1 513 and f2 310 to transmit and receive to and from the UE 330 through one of the multiple carriers. However, the CA-enabled UE 330 is capable of transmitting signals on the multiple carriers.

In this way, the eNB 305 is capable of allocating carriers or serving cells to the carrier aggregation-enabled UE 330 in adaptation to the channel condition to increase the data rate of the UE 330.

Unlike the exemplary situation of FIG. 3, the signals can be transmitted received by means of a transmission/reception device installed at locations far from the eNB geographically such as Remote Radio Head (RRH). At this time, it is preferred for the UE to set uplink transmission timings in the serving cells of the transmission/reception devices located at the same place as the eNB and the transmission/reception devices located at other places such as RRH to different values. This is because the propagation delay environments of the two serving cells are likely to be different considerably.

If the UE is configured with SCell of which location differs from that of the PCell so as to have an uplink transmission timing different from that of the PCell, it is necessary for the UE to perform a random access procedure in the SCell to determine the uplink transmission timing.

Figure 4:
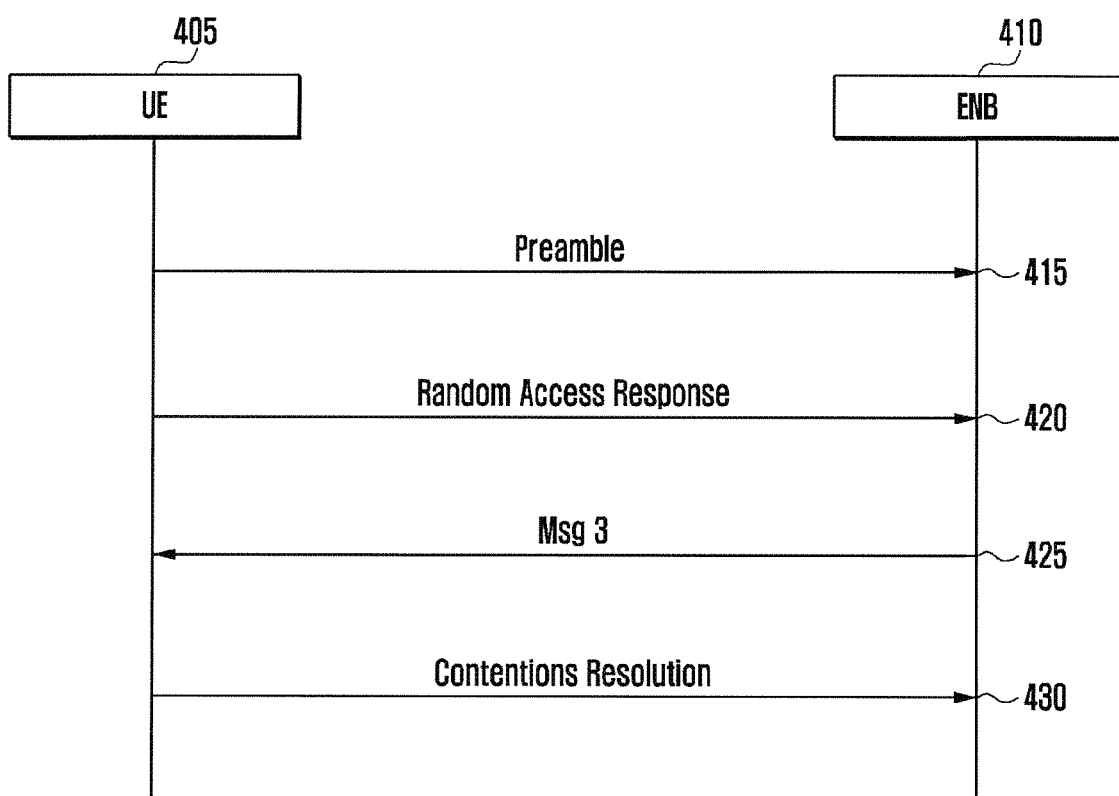
FIG. 4 is a signal flow diagram illustrating the random access procedure.

FIG. 4 is a signal flow diagram illustrating the random access procedure.

The random access procedure is made up of 4 steps, i.e. transmitting preamble, receiving random access response, transmitting message 3, and receiving contention resolution.

If a random access is triggered by a certain reason, the UE 405 determines the preamble transmission timing, transmission resource (frequency and time resources), and type of the preamble based on the random access transmission resource information of the cell in which the random access is performed. The UE transmits the preamble at the preamble transmission power calculated based on the current channel condition, e.g. pathloss, at step 415.

Upon receipt of the preamble transmitted by the UE, the eNB 410 sends the UE 405 a response message in reply thereto at step 420. The response message may include uplink Timing Advance (TA) of the UE or uplink transmission resource information (UL grant) for message 3 transmission.

If the response message is received, the UE 405 transmits the message 3 at step 425. The message 3 includes UE identifier and, if the message 3 is received successfully, the eNB transmits a response called Contention Resolution at step 430. If no preamble is received, the eNB 410 does not transmit the response message and thus the UE 405 fails receiving the response message. The UE 405 retransmits the preamble at a transmit power increased by predetermined amount, as a part of uplink power control, after a lapse of a predetermined time period.

If cell congestion occurs, the eNB performs congestion control. One example of the congestion control is Access Class Barring (ACB) (see TS36.331). The ACB is a technique of controlling the random access of the UEs in the idle state. According to the ACB, the UE in the idle state determines whether to perform random access statistically based on the ACB parameters broadcast in the system information. This makes it possible to avoid the problem occurring when all of the UEs in the idle state perform random access simultaneously in the cell congestion environment.

The UE in the connected state may be allocated Dedicated Scheduling Request (D-SR) transmission resource, and the UE in the connected state which is configured with the D-SR transmission resource performs random access in a very restricted case. By taking notice of current tendency of increase of the number of UEs in the connected state due to the widespread use of smartphone and increase of always-on type services, it may be impossible to allocate D-SR transmission resource to all the UEs in the connected state. The increase of the number of UEs which are not allocated D-SR transmission resource may increases the random access load. There is therefore a need of controlling the random access by applying the congestion control scheme such as ACB even to the UEs in the connected state.

The UE in the connected state may perform random access in four cases as follows.

1. The eNB instructs the UE in the connected state to perform random access.

2. High priority UL data occurs in the state where no uplink transmission resource is allocated to the UE in the connected state.

3. The UE in the connected state has found a cell of which channel quality is higher than a predetermine threshold in the Connection Reestablishment procedure.

4. The UE in the connected state is performing handover.

In the first case, the random access is triggered by direction control of the eNB and thus there is no need of applying ACB or similar scheme. Since the RRC Connection Reestablishment procedure affects significantly to the user's sensible service quality, it is not preferred to delay the random access by applying the ACB or similar scheme. If the random access is delayed due to the ACB or similar scheme, this is likely to cause handover failure. Accordingly, in some embodiments of the present invention, the congestion control for random access of the UE in the connected state is applied only to the resume of uplink transmission.

The eNB transmits the information about the congestion control using the system information of the cell in which the congestion occurs among the cells under its control. This information may be ACB-related information or similar type information or another type of information for the UE in the connected state. As aforementioned, the ACB aims to control the RRC connection establishment attempt of the UE in the idle state distinctly depending on the purpose of the RRC connection establishment attempt. The ACB information is broadcast in the System Information Block type 2 (SIB 2) and made up of three informations as follows.

i) ac-BarringForEmergency, ii) ac-BarringForMO-Signalling, iii) ac-BarringForMO-Data The ac-BarringForEmergency is the information controlling the connection setup for emergency call. The ac-BarringForMO-Signalling is the information controlling the connection setup for transmitting signaling information such as Tracking Area Update (TAU). The ac-BarringForMO-Data is the information controlling the connection setup for user data transmission of the UE. Among the three informations, the ac-BarringForMO-Data may be used for controlling the use of random access in the connected state. This is because the random access of the UE in the connected state is performed to transmit user data in most cases.

Some embodiments of the present invention provide a method of using the ac-BarringForMO-Data of ACB or the like or separate information for congestion control of the UE in the connected state.

In the case of using a different type of information instead of the ac-BarringForMO-Data for congestion control, the separate information may include BarringPriority and BarringTime. The separate information may be broadcast in a predetermined system information block, e.g. SIB type 15.

The UE in the RRC connected state monitors the connected state control information continuously and, when random access is required for a certain reason, determines whether to start random access based on the congestion control information.

Figure 5:
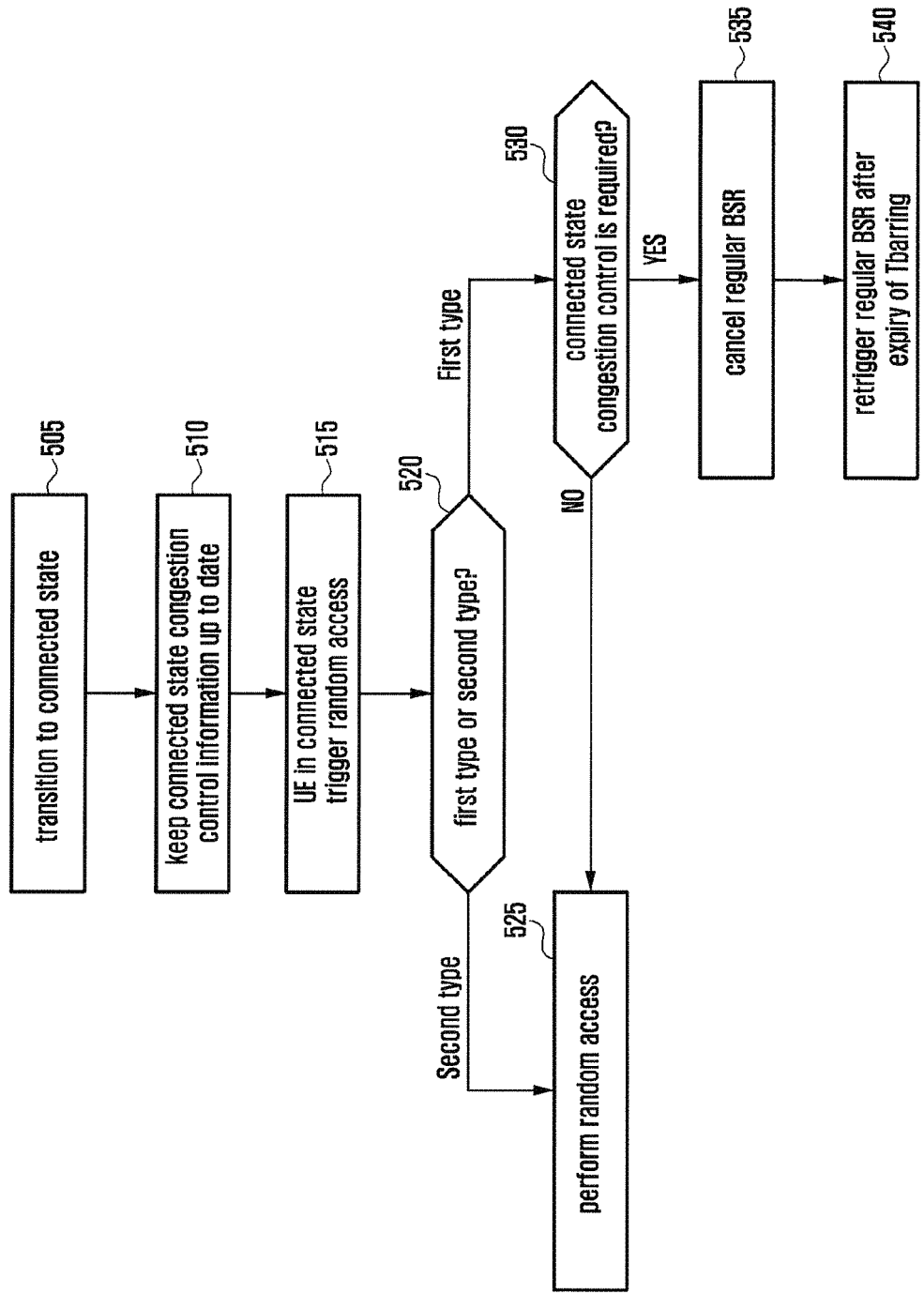
FIG. 5 is a flowchart illustrating a congestion control procedure of the UE according to the first embodiment of the present invention.

FIG. 5 is a flowchart illustrating a congestion control procedure of the UE according to the first embodiment of the present invention.

The UE transitions to the idle state for a certain reason at step 505. The UE initiates random access procedure by sending an RRC Connection Request control message, and the eNB sends the UE a RRC Connection Setup control message. After the RRC connection setup, the UE performs regular operation in the cell. The UE determines whether the serving cell supports connected state congestion control. If the serving cell supports the connected state congestion control, the UE acquires system information, particularly, the connected state congestion control information, and keeps the information up to date. The eNB notifies the UE whether the serving cell is of supporting the connected state congestion control using a predetermined indicator included in the RRC Connection Configuration control message or, if in the course of performing handover, the RRC Connection Reconfiguration control message.

If the current serving cell does not support the connected state congestion control, the UE in the connected state initiates random access without any determination process when the random access is triggered. In the embodiment of FIG. 5, it is assumed that the serving cell supports the connected state congestion control.

If the current serving cell supports the connected state congestion control, the UE keeps the connected state congestion control information up to date at step 510. The UE stores the connected state congestion control information acquired through the SIB type 2 or SIB type 15 and then monitors the system information to detect any change therein. If the system information changes, the UE acquires the changed information.

If the random access is triggered by a certain reason at step 515, the UE determines checks the type of the random access trigger at step 520. If the random access trigger type is a first type, the procedure goes to step 530 in order to apply the congestion control. If the random access trigger type is a second type, the procedure goes to step 525.

In the embodiment of FIG. 5, the first type random access includes 'the random access which is triggered to resume uplink transmission.' For example, if the following conditions are all fulfilled, the UE determines that the random access is triggered for resuming uplink transmission.

<Conditions for Determining Random Access Triggered for Resuming UL Transmission>

1. A regular Buffer Status Report (BSR) is triggered is triggered at a certain UE at a certain timing.

2. No Scheduling Request (SR) transmission resource of Physical Uplink Control Channel (PUCCH) is allocated to the UE.

3. The priority of the logical channel on which the regular BSR is triggered is lower than a predetermined threshold.

4. The data triggered the regular BSR is neither Common Control Channel Service Data Unit (CCCH SDU) such as RRC connection reestablishment request message nor RRC connection reconfiguration complete message.

The BSR is the control information for reporting UE buffer state to the eNB. The BSR may be performed with one of a short BSR format and a long BSR format. The BSR may carry the Buffer Status (BS) of at least one and up to 4 Logical Channel Group (LCG). The short BSR is used when there is one LCG having the data to be transmitted and is composed of the LCG identifier and BS. The long BSR is used to report the buffer status of four LCGs and contains the BSs of the LCGs in an order of the LCG identifiers. The LCG is a set of the logical channel grouped under the control of the eNB, and the logical channels have similar logical channel priorities. The buffer status of the LCG is the sum of the buffer status related to the logical channels included in the LCG and shows the data amount that can be transmitted among the data of RLC transmission buffer, retransmission buffer, PDCP transmission buffer of the logical channels. The BSR may be triggered periodically or when a predetermined condition is fulfilled, e.g. when the data having a priority higher than that of the currently stored data occurs. The former is referred to as periodic BSR, and the latter is referred to as regular BSR. If the regular is triggered, the UE acquires the transmission resource or the regular BSR through the random access procedure or the SR transmission resource. The SR transmission resource may be the transmission resource occurring periodically on the Physical Uplink Control Channel (PUCCH and may be configured to the UE through RRC connection setup procedure. The eNB may not be able to allocate SR transmission resource to all UEs. The UE which is not allocated the SR transmission resource initiate random access procedure.

The second type random access may include several cases as follows.

1. Random access triggered for handover. Or random access for transmitting handover complete control message in the target cell.

2. Random access triggered by the eNB transmitting predetermined control information (Physical Downlink Control Channel (PDCCH) order) to the UE.

3. Random access triggered by the UE transmitting RRC Connection Reestablishment Request control message in the RRC connection reestablishment procedure.

4. Random access triggered by the UE using a dedicated preamble.

The dedicated preamble is a preamble designated by the eNB, and the eNB may allocate the dedicated preamble to the UE in the course of instructing the UE to perform random access or handover.

If the second type random access is triggered, the procedure goes to step 525 at which the UE performs the random access without any determination process although the connected state congestion control information is broadcast in the current serving cell or the serving cell supports the connected state congestion control. The random access procedure is performed in such a way that the UE transmits a random access preamble in a certain serving cell, monitors PDCCH of the serving cell to receive a random access response message, and performs uplink transmission based on the uplink grant contained in the random access response message in the serving cell through which the random access preamble has been transmitted.

If the first type random access is triggered, the procedure goes to step 530 at which the UE determines whether to apply the connected state congestion control. For example, if the following connected congestion control application conditions are all fulfilled, the UE determines that it is necessary to apply the congestion control and thus the procedure goes to step 535. If any of the following conditions is not fulfilled, the UE determines that it is not necessary to apply the congestion control and thus the procedure goes to step 525.

<Conditions for Applying Connected State Congestion Control>

1. The connected state congestion control information is broadcast in the current serving cell.

2. It fails to pass the test for applying the congestion control.

The connected state congestion control information may be provided in the form of ac-BarringForMO-Data or ac-BarringForMO-Data-Connected. The ac-BarringForMO-Data is broadcast in the SIB type 2, and the ac-BarringForMO-Data-Connected in the SIB type 15. The ac-BarringForMO-Data includes ac-BarringFactor and ac-BarringTime, and the ac-BarringForMO-Data-Connected includes BarringFactor, BarringPriority, and BarringTime.

In the case of the connected state congestion control information in the form of ac-BarringForMO-Data, the UE generates a random real number in the range from 0 to 1 and, if the real number is greater than the ac-BarringFactor, determines that the congestion control application test succeeds and, otherwise real number is less than the ac-BarringFactor, the UE determines that the congestion control application test fails.

In the case of the connected state congestion control information in the form of ac-BarringForMO-Data-Connected, the UE compares the priority of the data triggered the regular BSR with the BarringPriority. If the priority of the data is higher than the BarringPriority, the UE determines that the congestion control application test succeeds. Otherwise if the priority of the data is lower than the BarringPriority, the UE generates a random real number in the range from 0 to 1 and determines, if the real number is greater than the BarringFactor, that it has passed the test and, otherwise if the real number is less than the BarringFactor, it has failed the test.

At step 535, the UE cancels the regular BSR to prevent random access attempt. The UE configures a timer Tbarring and, if the data triggered the regular BSR is in the buffer yet and if there is no other data with higher priority, the UE retriggers the regular BSR at step 540. If the connected congestion control information is the ac-BarringForMO-Data, the Tbarring is set by equation (1).

$$Tbarring=(0.7+0.6*rand) \times ac\text{-}BarringTime \quad (1)$$

If the connected congestion control information is the ac-BarringForMO-Data-Connected, the Tbarring is set by equation (2).

$$Tbarring=(0.7+0.6*rand) \times BarringTime \quad (2)$$

In equations (1) and (2), rand denotes a real number selected randomly in the range from 0 to 1.

A description is made of another congestion control method of the UE in the connected state hereinafter.

It may fail to allocate D-SR transmission resource to all the UEs in the connected state. It is the case especially in consideration of the current tendency of increase of the number of UEs in the connected state due to the popularity of smartphones and always-on type services. The increase of the number of UEs which are not allocated the D-SR transmission resource is likely to increase the random access load. In order to mitigate the random access load, the present invention proposes a method of applying the random access resource selectively depending on the logical channel for transmitting the data in the situation where the UEs in the connected state attempt random access.

Figure 6:
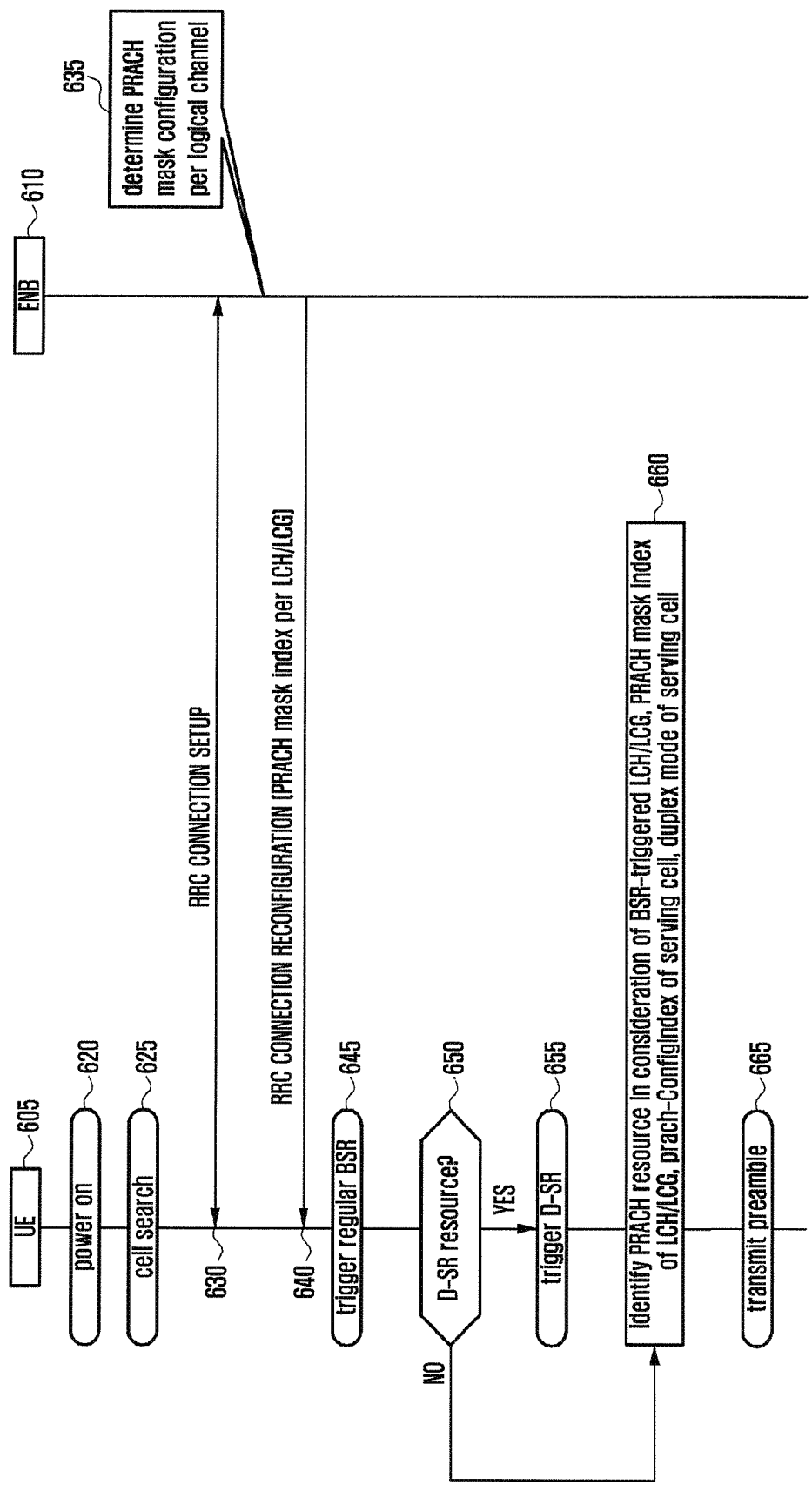
FIG. 6 is a signal flow diagram illustrating the communication procedure according to the second embodiment of the present invention.

FIG. 6 is a signal flow diagram illustrating the communication procedure according to the second embodiment of the present invention.

In FIG. 6, the mobile communication includes a UE 605 and an eNB 610. The UE 605 powers on at step 620. The UE 605 searches for a cell of which electric wave is received and a Public Land Mobile Network (PLMN) through a search procedure and determines the PLMN and cell to establish a connection based thereon at step 625.

Figure 12:
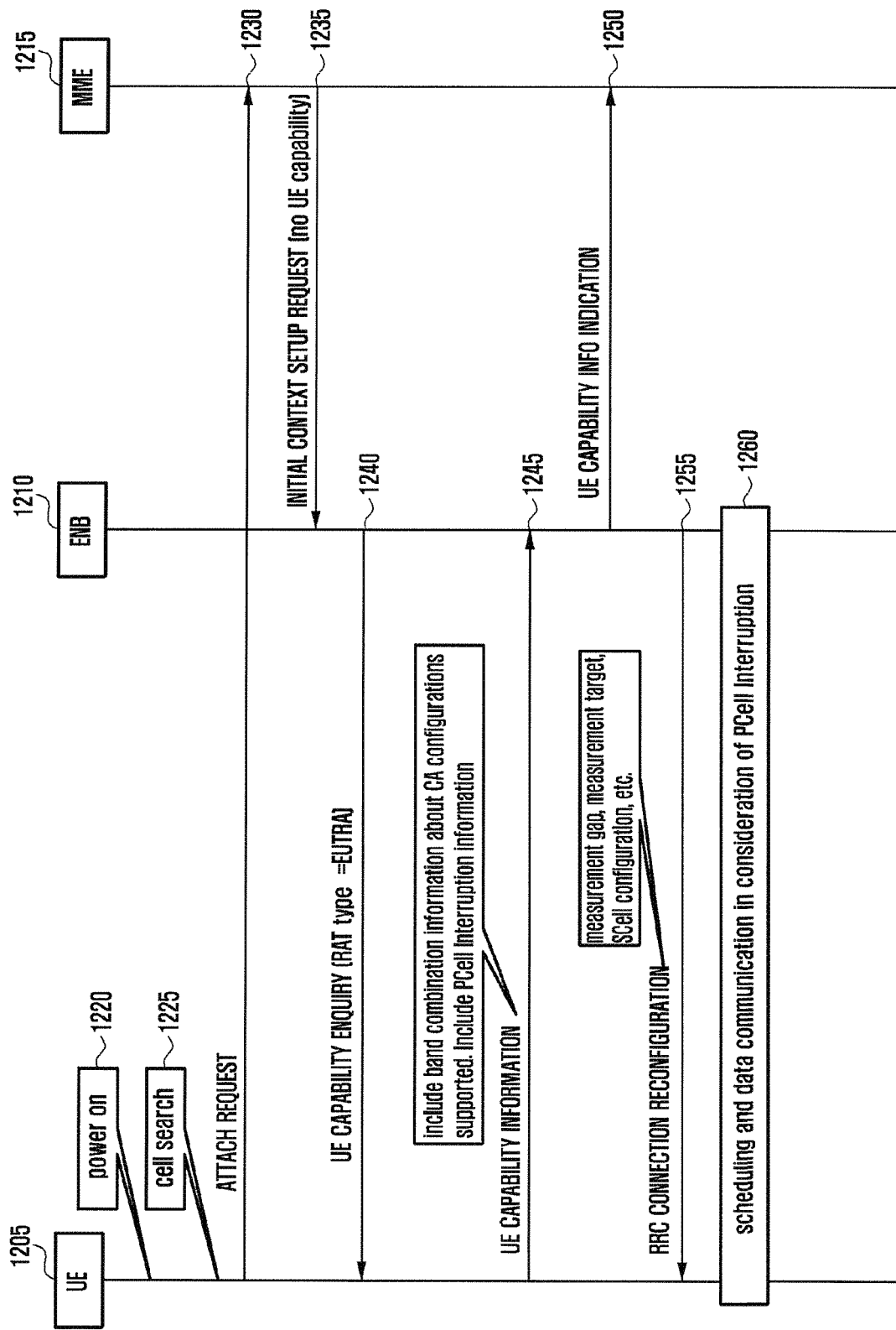
FIG. 12 is a signal flow diagram illustrating a communication procedure according to the fourth embodiment of the present invention.

The UE 650 performs the RRC Connection Setup procedure through the selected cell at step 630. The UE transmits a preamble, receives a random access response message transmitted by the eNB 610 in reply, and transmits to the eNB 610 a control message requesting for RRC Connection based on the uplink grant included in the random access response message. Upon receipt of the message, the eNB 610 sends the UE 605 an RRC Connection Setup message, and the UE 605 configures the Signaling Radio Bearer (SRB) for RRC control message transmission such that the RRC connection establishment procedure completes. After the RRC connection setup procedure, the UE 605 and an MME performs a registration procedure, and the eNB 610 acquires UE information in the registration procedure and stores and manages the context of the UE 650, as shown in FIG. 12.

If it is determined to configure Data Radio Bearer (DRB) to the UE 605 for data communication, the eNB sends the UE 605 an RRC Connection Reconfiguration message including the radio bearer configuration information. If the UE 605 is not allocated D-SR resource and if there is large number of UEs which are not allocated the D-SR resource, the eNB 610 determines to allocate Physical Random Access Channel (PRACH) mask index per Logical Channel (LCH) or LCH Group (LCG) at step 635. The LCH is the logical channel mapped to the radio bearer one by one and works as a path between RLC entity of the radio bearer and a MAC entity.

The PRACH mask index is an integer in the range from 0 to 15 and defined for use in Frequency Division Duplex (FDD) and Time Division Duplex (TDD) modes as shown in table 1.

TABLE 1

| PRACH Mask Index | Available PRACH resource (FDD) | Available PRACH resource (TDD) |
|---|---|---|
| 0 | All | All |
| 1 | PRACH Resource Index 0 | PRACH Resource Index 0 |
| 2 | PRACH Resource Index 1 | PRACH Resource Index 1 |
| 3 | PRACH Resource Index 2 | PRACH Resource Index 2 |
| 4 | PRACH Resource Index 3 | PRACH Resource Index 3 |
| 5 | PRACH Resource Index 4 | PRACH Resource Index 4 |
| 6 | PRACH Resource Index 5 | PRACH Resource Index 5 |
| 7 | PRACH Resource Index 6 | Reserved |
| 8 | PRACH Resource Index 7 | Reserved |
| 8 | PRACH Resource Index 8 | Reserved |
| 10 | PRACH Resource Index 8 | Reserved |
| 11 | Every, in the time domain, even PRACH opportunity 1$^{st}$ PRACH Resource Index in subframe | Every, in the time domain, even PRACH opportunity 1$^{st}$ PRACH Resource Index in subframe |
| 12 | Every, in the time domain, odd PRACH opportunity 1$^{st}$ PRACH Resource Index in subframe | Every, in the time domain, odd PRACH opportunity 1$^{st}$ PRACH Resource Index in subframe |
| 13 | Reserved | 1$^{st}$ PRACH Resource Index in subframe |
| 14 | Reserved | 2$^{nd}$ PRACH Resource Index in subframe |
| 15 | Reserved | 3$^{rd}$ PRACH Resource Index in subframe |

If the PRACH mask index n is configured to the LCH x or LCG x', this has the following meaning.

If the available PRACH resource indicated by the PRACH mask index n is m, the random access for the regular BSR related to the LCH x or LCG x' may be initiated in the intersection between the PRACH resource determined by the PRACH resource index m and the PRACH resource configured in the current cell.

The PRACH resource index (or PRACH configuration index) indicates the time/frequency resource region available for transmitting random access preamble. The PRACH configuration index is defined distinctively for FDD and TDD due to the difference in frame structure between the TDD and FDD, as shown in table 2 for FDD and table 5.7.1-3 of TS 36.211 for TDD.

TABLE 2

| PRACH Configuration Index | Preamble Format | System frame number | Subframe number |
| --- | --- | --- | --- |
| 0 | 0 | Even | 1 |
| 1 | 0 | Even | 4 |
| 2 | 0 | Even | 7 |
| 3 | 0 | Any | 1 |
| 4 | 0 | Any | 4 |
| 5 | 0 | Any | 7 |
| 6 | 0 | Any | 1, 6 |
| 7 | 0 | Any | 2, 7 |
| 8 | 0 | Any | 3, 8 |
| 8 | 0 | Any | 1, 4, 7 |
| 10 | 0 | Any | 2, 5, 8 |
| 11 | 0 | Any | 3, 6, 8 |
| 12 | 0 | Any | 0, 2, 4, 6, 8 |
| 13 | 0 | Any | 1, 3, 5, 7, 8 |
| 14 | 0 | Any | 0, 1, 2, 3, 4, 5, 6, 7, 8, 8 |
| 15 | 0 | Even | 8 |

The eNB 610 determines the PRACH mask index to be allocated in configuring the logical channel or logical channel group to the UE 605. The logical channel/logical channel group with high priority or weight may be allocated a PRACH mask index including more PRACH resource, and the logical channel/logical channel group with low priority or weight may be allocated the PRACH mask index including less PRACH resource. Certain logical channels, e.g. logical channels/logical channel groups mapped to SRB, might have been allocated a predetermined PRACH mask index implicitly such that only the rest logical channels/logical channel groups are allocated the PRACH mask indices. The PRACH mask index allocated implicitly may be the PRACH index 0.

Some of the reserved values of the PRACH mask index (13~15 in FDD, and 7~10 in TDD) may be used for special purpose. For example, one of the reserved values (hereinafter, referred to as R for explanation convenience) may be used for indicating the resource other than the PRACH resource allocated to the logical channels/logical channel groups with the exception of the logical channel/logical channel group mapped to SRB among the PRACH resources configured to the current serving cell. For example, the UE 605 is allocated LCG 0, LCG 1, and LCG 4; the LCG 1 is allocated the PRACH mask index 1; the duplex mode of the corresponding serving cell is FDD; and the PRACH configuration index is 13. This means that the PRACH mask index of LCG 4 is set to R and the LCG 4 is allocated the PRACH resource (frequency resources of subframe numbers 3, 5, 7, and 8) with the exception of the PRACH resource indicated by the PRACH mask index 1 (frequency resource of subframe number 1) among the PRACH resource determined by the PRACH configuration index 13 (frequency resource of subframe number 1, 3, 5, 7, and 8).

The eNB 610 sends the UE 605 the RRC Connection Reconfiguration message including the DRB configuration information (drb-ToAddModList), logical channel configuration information (logicalChannelConfig), and PRACH mask index list information at step 640. The PRACH mask index list information contains the PRACH mask index information of the logical channels/logical channel groups arranged in an order of the identifiers of the logical channels/logical channel groups configured to the UE 650. The PRACH mask index list information does not include the PRACH mask index corresponding to the SRB/logical channel group 0, and the UE 605 applies a value predetermined implicitly. If the PRACH mask index list information is not signaled, the UE 605 applies a value predetermined implicitly, e.g. PRACH mask index 0, to all of the logical channels/logical channel groups. For example, in the case that the UE 605 is configured with the LCGs 0, 1, and 4, if the PRACH mask index list information includes 1 and 2, this means that the PRACH mask index 1 is configured to the PRACH mask index 1, and the PRACH mask index 2 to the LCG 2.

If the regular BSR is triggered at step 645, the procedure goes to step 650 at which the UE determines whether any D-SR resource is allocated. If D-SR resource is allocated, this means that the UE is configured with the PUCCH transmission resource for transmitting SR.

If the D-SR resource is allocated, the UE 605 triggers D-SR at step 655. That is, the UE transmits the SR using the PUCCH transmission resource.

If no D-SR resource is allocated, the procedure goes to step 660. At step 660, the UE 605 determines the PRACH resource for transmitting preamble as follows.

1. If PRACH mask index list information is not signaled, the UE determines that all the PRACH resources indicated by the random access resource configuration (prach-ConfigIndex) are the PRACH resources available for transmitting the preamble.

2. If PRACH mask index list information is signaled, then the UE operates as follows.

The UE 605 checks the PRACH mask index of the LCH/LCG triggered the regular BSR. The regular BSR is triggered when new data occurs on the logical channel or the retxBSR-Timer expires. If the BSR is triggered by the occurrence of new data, the UE checks the PRACH mask index of the logical channel/logical channel group of the data. If the regular BSR is triggered by the expiry of the timer, the UE checks the PRACH mask index of the logical channel/logical channel group of the data with the highest priority among the data stored in the UE 605 and capable of being transmitted at the corresponding time point.

The UE 605 checks the duplex mode of the current serving cell. If the duplex mode is FDD, the UE 605 applies the PRACH resource defined available for the FDD and, otherwise, if the duplex mode is TDD, the PRACH resource defined available for TDD.

The UE 605 checks the random access resource configuration of the serving cell to determine the PRACH resource configured to the current serving cell.

The UE 605 determines the PRACH resource in the intersection between the available PRACH resource indicated by the PRACH mask index and the PRACH resource configured to the serving cell as the PRACH resource available for transmitting the preamble.

The UE 605 transmits the preamble using the resource selected among the PRACH resources available for transmitting the preamble at step 665. For example, the UE 605 may select the PRACH resource configured for the time point closest to the current time among the PRACH resources.

Third Embodiment

The PDCP sequence number is 7-bit or 12-bit wide. By taking notice that a PDCP SDU corresponds to an IP packet and a normal IP packet has the maximum size of 1500 bytes, the 12-bit sequence number restricts the peak data rate to 0.88 Gbps under the assumption that the Round Trip Time (RTT) of the PDCP end is 25 ms in handover. In consideration of the tendency of increase in transmission speed of the LTE-A mobile communication system, the peak data rate of 1 Gbps is not enough. In this embodiment, a long sequence number (hereinafter, referred to as extended sequence number) is introduce to increase the peak data rate.

The LTE/LTE-A mobile communication system has been evolved from the initial version of Rel-8 stipulating new release every one or one and a half year. The extended sequence number is expected to be introduced in Rel-11 or Rel-12 and thus the term 'new release' is used to refer to the release in which the extended sequence number is introduced and the term 'legacy release' to the release before the extended sequence number is introduced. The eNB of new release (hereinafter, referred to as new eNB) is capable of configuring the extended sequence number to the UE while the eNB of the legacy release (hereinafter, referred to as legacy eNB) neither understands nor use the extended sequence number. The length of the extended sequence number may be considered diversely, it seems to be appropriate to extend the sequence number to 15 bits using the three reserved bits of the current format by taking notice of the current PDCP PDU format. Although the sequence number is extended to 15 bits in this embodiment, the length of the extended sequence number may be determined differently. Also, the legacy sequence number field may have a certain length instead of 7 or 12 bits. The present embodiment is applicable to any case in which the sequence number is changed.

Figure 7A:
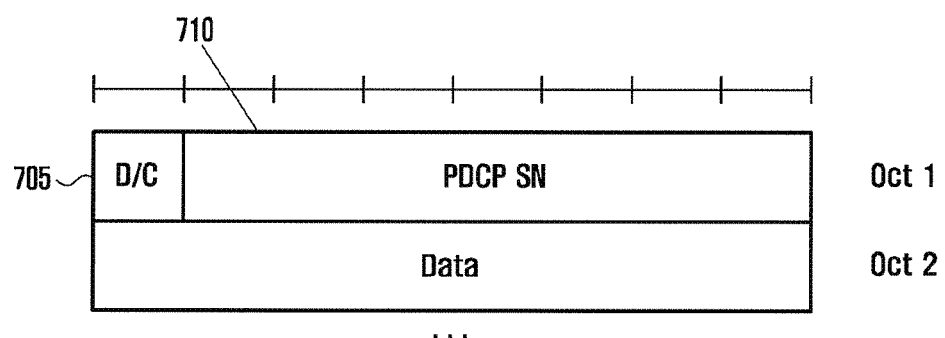
FIG. 7a is a diagram illustrating a PDCP PDU format having a 7-bit sequence number.

FIG. 7a is a diagram illustrating a PDCP PDU format having a 7-bit sequence number.

Figure 7B:
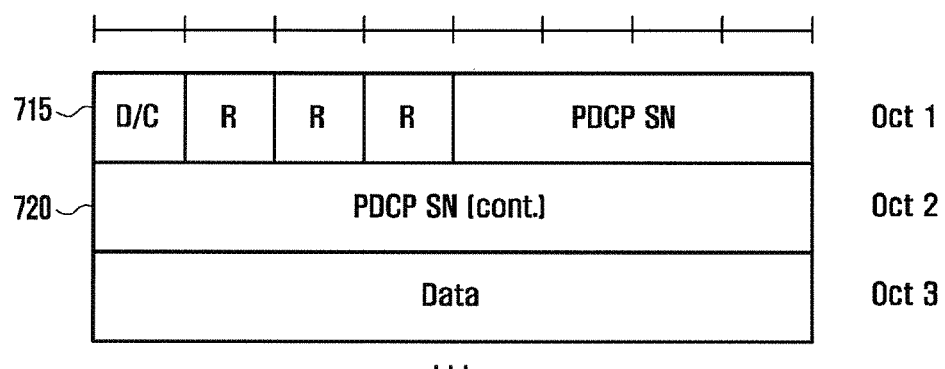
FIG. 7b is a diagram illustrating a PDCP PDU formation having a 12-bit sequence number.

FIG. 7b is a diagram illustrating a PDCP PDU formation having a 12-bit sequence number.

Figure 7C:
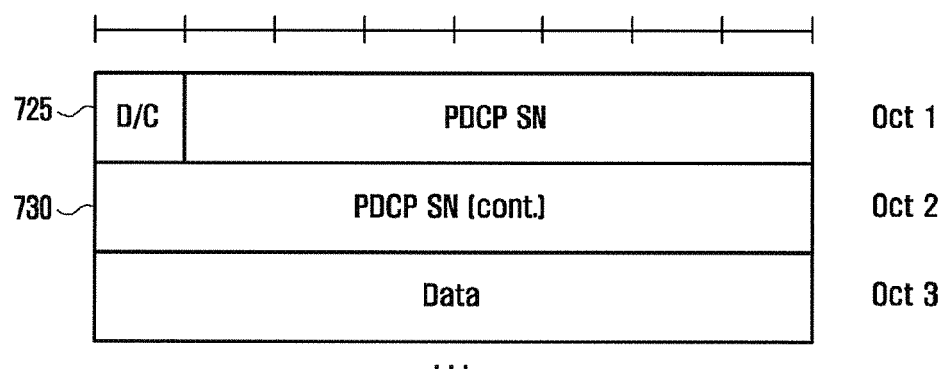
FIG. 7c is a diagram illustrating a PDCP PDU format having a 15-bit sequence number (extended sequence number).

FIG. 7c is a diagram illustrating a PDCP PDU format having a 15-bit sequence number (extended sequence number).

The PDCP PDU having the extended sequence number includes a 1-bit D/C field 725, a 15-bit sequence number 730, and a data field. The PDCP PDU having the 12-bit sequence number includes a 1-bit D/C field 715, 12-bit sequence number 725, and a data field. The PDCP PDU having the 7-bit sequence number includes a 1-bit D/C field 705, a 7-bit sequence number 710, and a data field. The D/C field indicates whether the corresponding PDU is a data (D) PDU or a control (C) PDU. The data field contains upper layer data such as IP packet. In the case that the UE performs handover from a legacy eNB to a new eNB or from a new eNB to a legacy eNB, the length of the PDCP sequence number may change. The eNB controls such that the UE adjusts the related-parameters in adaptation to the change of the length of the sequence number in the course of the PDCP operation or releases the current PDCP and configured the PDCP newly. The former case may be of handover from the legacy eNB to the new eNB, and the latter case may be of the handover from the new eNB to the legacy eNB.

FIG. 8 is a signal flow diagram illustrating the handover procedure according to the third embodiment of the present invention. In FIG. 8, the mobile communication system includes a UE 805, a source eNB 810, and a target eNB 815. The source eNB 810 makes a handover decision to the target eNB 815. The handover decision is made in consideration of the load status of the current cell and channel condition of the UE 805. The source eNB 810 sends the target eNB 815 a control message requesting for handover at step 825. This message may include informations as follows.

1. Target Cell ID: Identifier of the handover target cell
2. E-RABs To Be Setup List: E-RAB corresponds to radio bearer and Evolved Packet System (EPS) bearer and is identified by the eps bearer identifier (eps-bearerIdentity). This information includes eps-bearerIdentity per EPS bearer and required QoS information. The bearer is a path of processing data requiring a predetermined QoS and referred to as EPS bearer between the UE 805 and S-GW and E-RAB between the UE 805 and eNB. One or two radio bearers are established per E-RAB.
3. RRC Context: Various configuration information configured to the UE 805 by the source eNB 810 and capability information of the UE 805 (e.g. extended PDCP Sequence Number (SN) supportability).

The target eNB 815 sends the source eNB 810 a control message for accepting the handover at step 830, the control message including the informations as follows.

1. E-RABs Admitted List: List of E-RABs configured by the target eNB 815. The target eNB 815 may configure some of the E-RABs requested by the source eNB 810.
2. Target eNB To Source eNB Transparent Container: This contains the control information transmitted from the target eNB 815 to the UE 805. In more detail, this includes the RRC message instructing handover. If the release of the source eNB 810 is higher than that of the target eNB 815 or if the source eNB 810 uses the extended PDCP SN but the target eNB 815 does not, the handover command message includes the control information instructing to release the Data Radio Bearer (DRB) with the extended PDCP SN and to establish a new DRB corresponding to the EPS bearer linked to the DRB. The newly established DRB is configured to do not use the extended PDCP SN. If the release of the target eNB 815 is higher than that of the source eNB 810 or if the source eNB 810 uses the normal PDCP SN but the target eNB 815 uses the extended PDCP SN, the control information instructing the UE 805 to continue performing PDCP operation may be included. The control information may be an indicator of instructing the use of the extended PDCP NS.

The source eNB 810 sends the UE 805 an RRC control message instructing handover at step 835. The control message includes the informations as follows.

1. Mobility Control Information (mobilityControlInfo): Target cell-related information, e.g. information including frequency and PCI of the target cell.
2. Radio Resource Configuration Information (radioResourceConfigDedicated): DRB configuration information to be applied to the target cell. The Data Radio Bearer (DRB) is mapped to the EPS bearer one by one, and the mapping relationship between DRB and EPS bearer is indicated by the eps bearer identifier included in the DRB configuration information. In the case where a certain EPS bearer x is mapped to a certain DRB y for which the extended PDCP sequence number is used, if the UE 805 is handed over to an eNB which does not support the extended PDCP sequence number, the eNB commands the UE 805 to release the DRB y and establish a new DRB z for which the normal PDCP sequence number is used and which is mapped to the EPS bearer x. This operation is possible by including fullConfig in the RRCConnectionReconfiguration message (hereinafter, referred to as signaling scheme 1) or including the control information for releasing the DRB linked to the EPS bearer and the control information for link of a newly configured DRB to the EPS bearer in one RRC control message (hereinafter, referred to as signaling scheme 2). If the fullConfig is included in the RRCConnectionReconfiguration message, this means releasing all of the DRBs configured by the current RRC configuration, e.g. DRB configuration information, and setting up DRB by applying the new DRB configuration information included in the RRCConnectionReconfiguration message. This can be understood as instructing to release the configuration based on the previous configuration information automatically and is advantageous in terms of reducing overhead as compared to instructing release per DRB explicitly. Hereinafter, releasing DRB and reconfiguring a new one based on the fullConfig is referred to as first case. In the case of changing the normal PDCP SN to the extended PDCP SN in the course of handover, the PDCP configuration information of the control information includes an indicator instructing the use of the extended PDCP SN. If the control message instructing handover in the situation of using the normal PDCP SN and if the control message includes the indicator instructing to use the extended PDCP SN, the UE 805 adjusts the PDCP SN and related parameters in the course of the PDCP operation. Adjusting the PDCP SN and related parameters, maintaining the DRB, is referred to as second case.

If the RRC Connection Reconfiguration message received at step 835 includes the fullConfig (i.e. the first case), the UE performs steps 840, 845, and 850. If the information included the RRC Connection Reconfiguration message received at step 835 fulfils the following condition (i.e. the second case), the procedure goes to step 853.

<Condition>

The normal PDCP SN is used before the receipt of the RRC Connection Reconfiguration message, and the RRC Connection Reconfiguration message indicates use of the extended PDCP SN The UE 805 releases the DRB indicated in the message at step 840. If the signaling scheme 2 has been used, the UE 805 releases the DRB indicated by the drb-identity included in the control information called drb-ToReleaseList. At this time, the UE 805 releases the RLC first and then the PDCP. If the signaling scheme 1 has been used, the UE releases the DRBs mapped to the EPS bearer identifiers (eps-BearerIdentity) listed in the drb-ToAddModList. In other expression, the UE releases the DRBs mapped to the eps bearer identifiers (eps-BearerIdentity) belonging to the current UE configuration among the eps bearer identifiers (eps-BearerIdentity) listed in the drb-ToAddModList. Releasing a DRB means discarding data stored at PDCP transmission/reception entities and RLC transmission/reception entities and releasing the entities. Otherwise if the condition is fulfilled, the UE 805 releases the DRB without discarding the data. Detailed description thereof is made in more detail with reference to step 850.

At step 845, the UE 805 sets up the DRB indicated in the control message. The UE 805 sets up the DRB by referencing the drb-ToAddModList. The drb-ToAddModList forms a code formatted as follows.

```
<code>
---------------------------------------------------------------------
    DRB-ToAddModList ::=                    SEQUENCE
(SIZE (1..maxDRB)) OF DRB-ToAddMod
    DRB-ToAddMod ::=        SEQUENCE {
    eps-BearerIdentity                      INTEGER
```

-continued

```
    (0..15)                 OPTIONAL,     -- Cond DRB-Setup
        drb-Identity                          DRB-Identity,
        pdcp-Config                           PDCP-
Config                      OPTIONAL,    -- Cond PDCP
        rlc-Config                            RLC-
Config                      OPTIONAL,    -- Cond Setup
        logicalChannelIdentity                INTEGER
    (3..10)                 OPTIONAL,     -- Cond DRB-Setup
        logicalChannelConfig
        LogicalChannelConfig    OPTIONAL, -- Cond Setup
    ...
    }
---------------------------------------------------------------------
```

At step 850, the UE 805 checks the DRBs fulfilling the following conditions. If the signaling scheme 1 has been used, the UE 805 delivers the downlink data stored in the released DRB which fulfills the following conditions to the upper layer other than discarding.

1. In the case that the signaling scheme 1 has been used, if the DRB whose eps-BearerIdentity value is included in the DRB-TAddModList and is part of the current UE configuration, i.e., in the case receiving the RRC Connection Reconfiguration message including fullConfig, if the esp-BearerIdentity mapped to any of currently configured DRB is included in the drb-ToAddModList too, it is determined that the DRB indicated by the esp-bearerIdentity fulfils the condition in the current configuration.

2. In the case that the signaling scheme 2 has been used, if a DRB corresponding to an certain eps-bearerIdentity is released and a new DRB corresponding to the eps-bearerIdentity is set up through one RRC control message (if a DRB associated with an eps-bearerIdentity is released and a new DRB is added and associated with the esp-bearerIdentity in the same message), it is determined that the corresponding DRB fulfils the condition.

For the DRB fulfilling the above conditions, the UE does not discard the data stored in the DRB right before being released but delivers the downlink data to the upper layer and transmits the uplink data to the newly established DRB. The downlink data stored in the DRB means the data to be segmented into RLC SDU and the data stored in the PDCP window among the data stored in the RLC reception buffer. As described above, by releasing the RLC first and then the PDCP, the data stored in the RLC is delivered to the PDCP (from the viewpoint of the RLC, PDCP is the upper layer which has upper layer such as IP layer). The uplink data stored in the DRB means the data stored in the transmission buffer of the PDCP. In more detail, the data stored in the PDCP transmission buffer may include following data.

1. type 1 data: data which has never delivered the upper layer yet (PDCP SDU for which on PDU has been submitted to the lower layer yet).

2. type 2 data: SDU having the lowest sequence number among the data which has been delivered to the lower layer but its successful transmission has not be determined and SDUs subsequent thereto (PDCP SDUs for which a corresponding PDU has been submitted to lower layers prior to the PDCP release, starting from the first SDU for which the delivery of the corresponding PDUs has not been confirmed by the lower layer). Also, only the data which have been delivered to the lower layer and of which successful transmission is not determined yet may be determined as the type 2 data.

Figure 9:
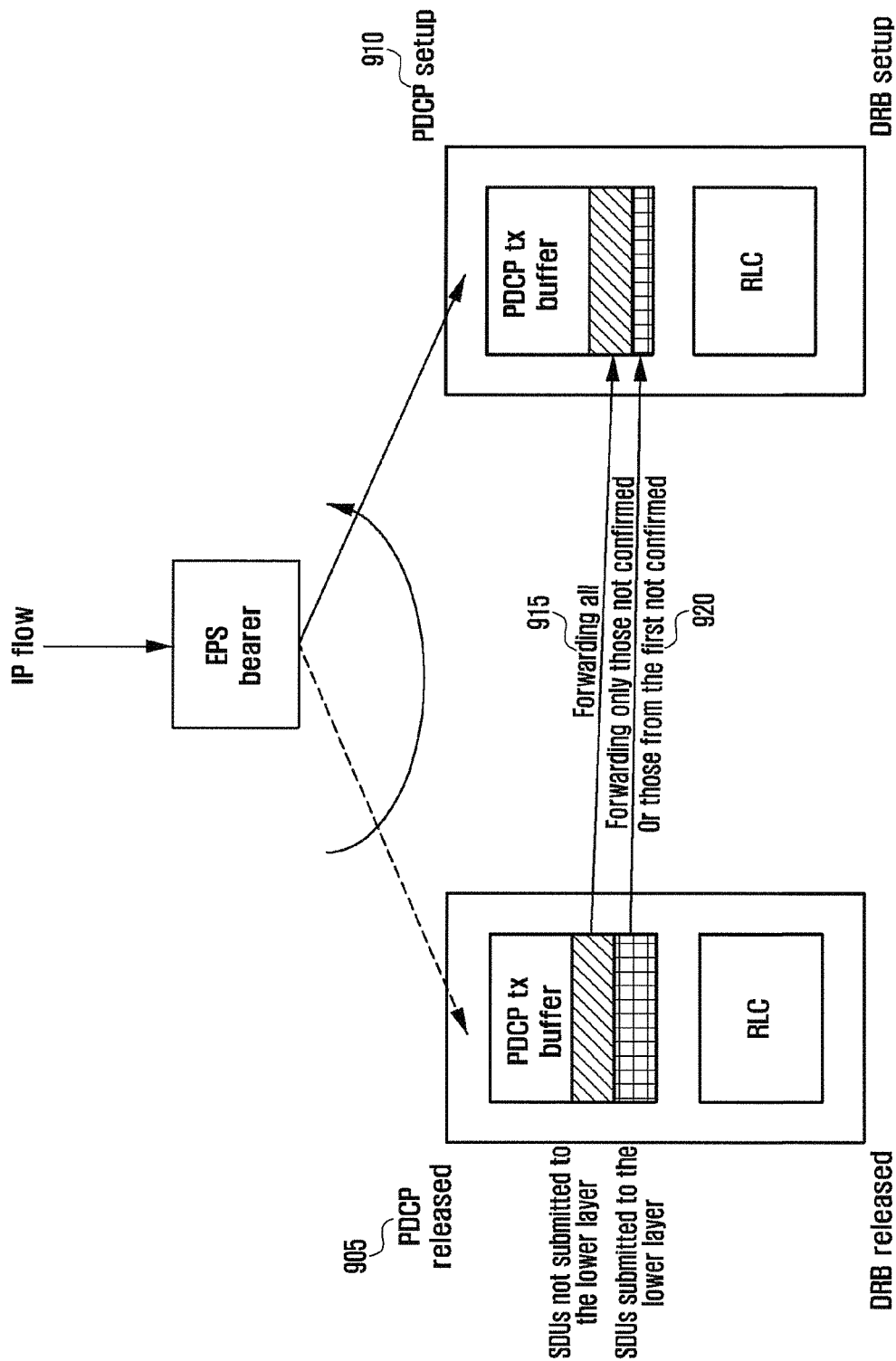
FIG. 9 is a diagram illustrating the local transfer according to the third embodiment of the present invention.

FIG. 9 is a diagram illustrating the local transfer according to the third embodiment of the present invention.

FIG. example, when the PDCP is released, if the PDCP transmission buffer has data up to PDCP SDU [100], data of up to PDCP SDU [80] have been transmitted, and the transmission of data of PDCP SDUs [75] and [70] are not confirmed, the PDCP SDUs [81] to [100] are the type 1 data and the PDCP SDUs [75] to [85] are the type 2 data. Or, the type 2 data correspond to the PDCP SDUs [75] and [70]. The UE performs local transfer on the type 1 data 915 and the type 2 data 920 of the PDCP 905 which is released for the DRB fulfilling the above condition to the PDCP 910 set up newly in mapping with the same eps bearer identifier (eps-bearerIdentity). At this time, the PDCP SDUs are transferred in the same order as the PDCP SDU COUNT. Or, the PDCP SDUs are transferred in the order as they arrive (i.e. first arrived first transferred). The COUNT is a sequence number for use in encryption/de-encryption at PDCP and has a length of 32 bits including Hyper Frame Number (HFN) of [32-n] bits and PDCP SN of n bits. Here, n denotes the length of PDCP SN.

At step 853, the UE reestablishes the PDCP entity and the RLC entity. If the RLC entity is established, it assembles all available RLC SDUs among the RLC PDUs stored in the reception buffer of the RLC entity into PDCP PDUs and transfers the PDCP PDUs to the PDCP entity. The PDCP entity processes the PDCP PDUs transferred by the RLC entity. In more detail, the UE 805 performs PDCP SN adjustment operation on the PDCP PDUs. The PDCP SN adjustment operation is performed when the normal PDCP SN is changed to the extended PDCP SN or vice versa. In the following, the description is directed to the case where the normal PDCP SN is changed to the extended PDCP SN. In the course of the PDCP SN adjustment operation, the reception-related parameter may be applied to the PDCP PDUs having the normal PDCP SN independently or after processing all the PDCP PDUs having eh normal PDCP SN.

[PDCP SN Adjustment Operation]
1. Identify DRBs indicated to switch from the normal PDCP SN to the extended PDCP SN (e.g. DRBs connected to RLC AM)
2. Adjust the parameters of the identified DRBs as follows.
    Add 2 Most Significant Bits (MSBs) to the Next_PDCP_TX_SN. The 2 bits are 2 LSBs of TX_HFN.
    Remove 2 LSBs of TX_HFN
    ADD 2 MSBs to Next_PDCP_RX_SN. The 2 bits are 2 LSBs of RX_HFN.
    Remove 2 LSBs of RX_HFN
    Add 2 MSBs to Last_Submitted_PDCP_RX_SN. The 2 bits are 2 LSBs of RX_HFN or a value obtained by subtracting 1 from 2 LSBs of RX_HFN.
    If the difference between the previous Last_Submitted_PDCP_RX_SN and the previous Next_PDCP_RX_SN is equal to or less than a predetermined value (i.e. half of the total number of normal PDCP SNs, or 2048), the 2 LSBs of RX_HFN are used. If the difference is greater than the predetermined value, a value obtained by subtracting 1 from the 2 LSBs of RX_HFN (e.g. 10 if the 2 LSBs are 11) is used.

The Next_PDCP_TX_SN denotes a variable storing the PDCP SN to be applied to the next PDCP SDU. The TX_HFN denotes the HFN related to the Next_PDCP_TX_SN. The COUNT to be applied to the next PDCP SDU is obtained by concatenating the TX_HFN and Next_PDCP_TX_SN.

The Next_PDCP_RX_SN denotes the parameter storing the PDCP SN of the PDCP PDU expected to be received next. The RX_HFN denotes the HFN related to the Next_PDCP_RX_SN. The COUNT to be applied to the PDCP SDU expected to be received next is acquired by concatenating the RX_HFN and Next_PDCP_RX_SN.

The Last_Submitted_PDCP_RX_SN denotes the PDCP SN of the last PDCP SDU delivered to the upper layer.

The source eNB 810 forwards the following SDUs to the target eNB 815 at step 855.
1. PDCP SDUs that have never been transmitted to the UE 805 yet
2. Data which has been transmitted to the UE 805 but of which successful transmission has not been confirmed at the lower layer.

The UE 805 acquires downlink synchronization with the target cell and performs random access procedure at step 860. If the random access completes successfully, the UE determines that the handover has completed successfully and thus transmits the RRC Connection Reconfiguration Complete message.

The UE 805 and the eNB operate as follows at step 865.
<Operation>
In the first case, the UE 805 and the target eNB 815 initialize the Hyper Frame Number (HFN) and PDCP SN to 0, and the target eNB 815 sends the UE 805 the PDCP SDUs received from the source eNB 810 sequentially.

In the second case, the target eNB 815 performs PDCP SN adjustment procedure and transmits a PDCP STATUS REPORT. The target eNB also transmits/receives PDCP SDUs that are requested for retransmission in the PDCP STATUS REPORT transmitted by the UE 805. The UE 805 transmits the PDCP STATUS REPORT and transmits/receives the PDCP SDUs requested for retransmission in the PDCP STATUS REPORT transmitted by the eNB. The PDCP STATUS REPORT includes the First Mission PDCP SN (FMS) information corresponding to the size of the extended PDCP SN.

Figure 10:
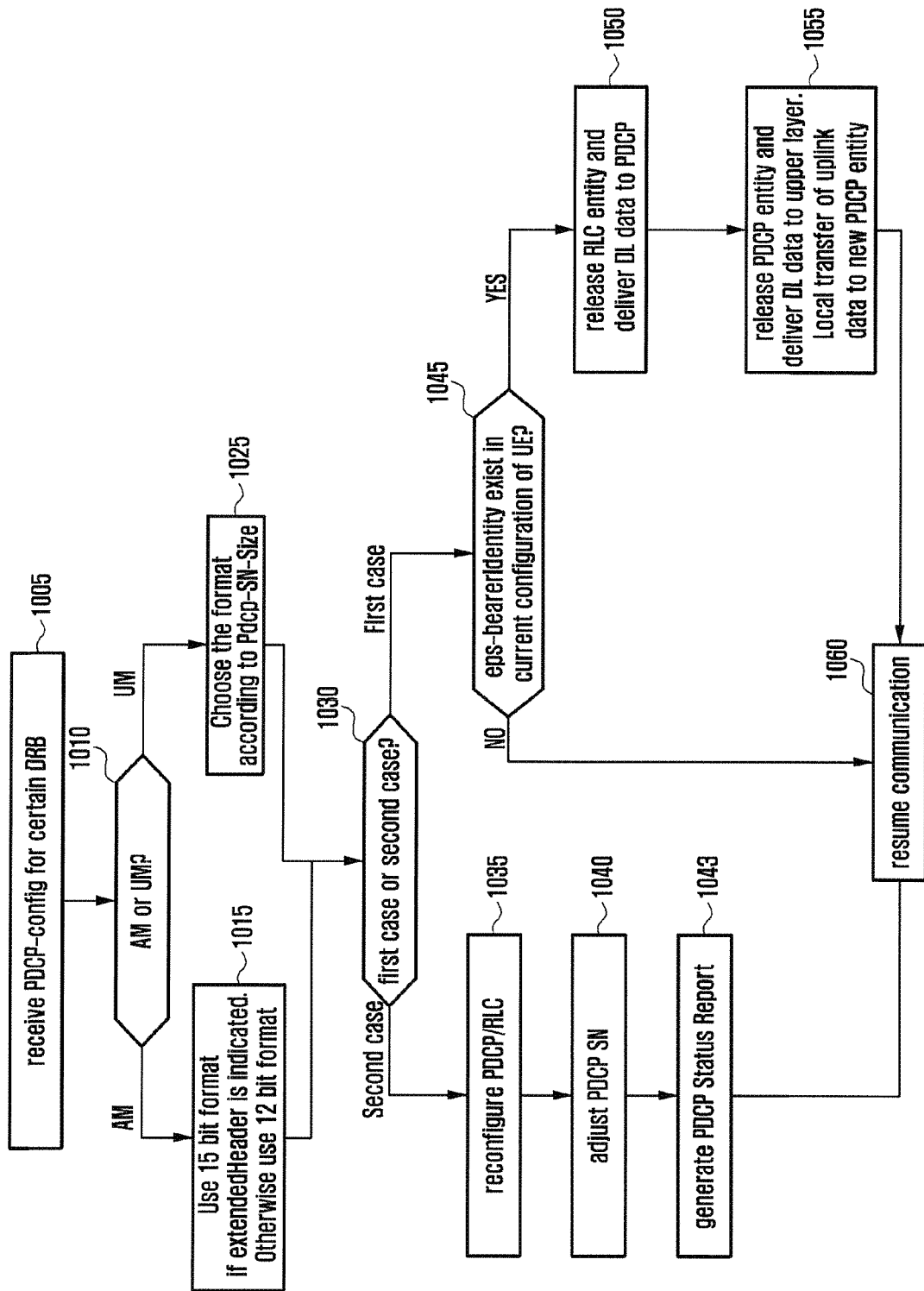
FIG. 10 is a flowchart illustrating the handover procedure of the UE 805 according to the third embodiment of the present invention.

FIG. 10 is a flowchart illustrating the handover procedure of the UE 805 according to the third embodiment of the present invention.

The UE 805 receives PDCP configuration information for a predetermined DRB at step 1005. The PDCP configuration information is transmitted to the UE 805 in the information called drb-ToAddModList.

The UE determines whether the DRB is RLC UM bearer or RLC AM bearer at step 1010. If the DRB is the AM bearer, the procedure goes to step 1015 and, otherwise, step 1025. The RLC UM bearer is the bearer configured for use in RLC UM mode, and the RLC AM bearer is the bearer configured for use in RLC AM mode. The RLC UM (Unacknowledged Mode) is the operation mode operating without Automatic Request (ARQ), and the RLC AM (Acknowledged Mode) is the operation mode operating with ARQ.

At step 1015, the UE 805 checks whether the PDCP configuration information includes the control information called extendedHeader as the indicator indicating the use of the extended sequence number and, if so, determines to use the 15-bit sequence number and, otherwise, the 12-bit sequence number.

At step 1025, the UE 805 checks whether the PDCP configuration information includes the control information called PDCP-SN-size and, if so, uses the sequence number length indicated in the control information. The sequence number length is 7 bits or 12 bits.

As described above, the PDCP SN of the RLC AM bearer is indicated by the extendedHeader field, and the PDCP SN of the RLC UM bearer is indicated by the pdcp-SN-size. By using different fields, it is possible to limit the length of each field to 1 bit. In order to notify of one of the 7-bit, 12-bit, and 15-bit length, it is necessary to use a 2-bit field.

The UE 805 determines whether it is the first case or the second case at step 1030. If it is the first case, the procedure goes to step 1045 and, otherwise, step 1035.

At step 1035, the UE 8085 reestablishes PDCP and RLC sequentially. At step 1040, the UE 805 performs the PDCP SN adjustment procedure as follows.

1. If the PDCP-config of step 1005 includes the extendedHeader and if the normal PDCP SN has been used before the receipt of the information, the UE performs the PDCP SN adjustment procedure.

2. If the PDCP-config of step 1005 includes no extendedHeader and if the extended PDCP SN has been used before the receipt of the information, the UE performs PDCP SN adjustment.

3. In other cases, the UE does not perform the PDCP SN adjustment procedure.

At step 1045, if the corresponding DRB is configured for generating the PDCP STATUS REPORT, the UE 805 generates the PDCP STATUS REPORT. Or if the corresponding DRB is configured to generate the PDCP STATUS REPORT and if the PDCP SN length is not changed, the UE generates the PDCP STATUS REPORT. The UE 805 determines the size of the FMS field to be applied to the PDCP STATUS REPORT as follows.

1. If the PDCP-config of step 1005 includes the extendedHeader, the UE configures the 15-bit FMS field of the PDCP STATUS REPORT.

2. If the PDCP-config of step 1005 includes not extendedHeader and the extended PDCP SN has been used already before the reception of the information, the UE configures the 12-bit FMS field of the PDCP STATUS REPORT.

3. If the PDCP-config of step 1005 includes no extendedHeader and if the normal PDCP SN has been used before the receipt of the information, the UE configures 12-bit FMS field of the PDCP STATUS REPORT.

At step 1045, the UE determines whether the newly configured PDCP and the eps-bearerIdentity of the DRB exist in the current configuration at step 1045. That is, the UE determines whether there is any DRB identical in eps-bearerIdentity with the newly configured DRB among the DRBs configured to the UE 805 before the receipt of the RRC control message including the fullConfig. If so, the procedure goes to step 1060 and, otherwise, step 1050. At step 1050, the UE releases the RLC entity of the DRB. If two RLC entities are configured on the DRB, the UE releases both the two RLC entities. Also, the UE assembles the RLC SDUs than can be assembled among the out-of-sequence data stored in the reception buffer of the RLC entity and delivers the assembled PDCP PDUs to the upper layer, i.e. PDCP layer.

At step 1055, the UE 805 releases the PDCP entity of the DRB. The UE delivers all of the out-of-sequence PDCP SDUs stored in the reception buffer of the PDCP to the upper layer. The UE also transfers predetermined data among the data stored in the transmission buffer of the PDCP, i.e. type 1 data and type 2 data, to the PDCP transmission buffer of the newly configured PDCP entity.

Unlike the conventional method of releasing the PDCP entity first and then the RLC entity, the method of this embodiment releases the RLC entity first and then the PDCP entity such that the out-of-sequence data stored in the reception buffer can be delivered to the upper layer before the release of the DRB.

The UE 805 resumes the communication by applying the new configuration at step 1060.

Figure 11:
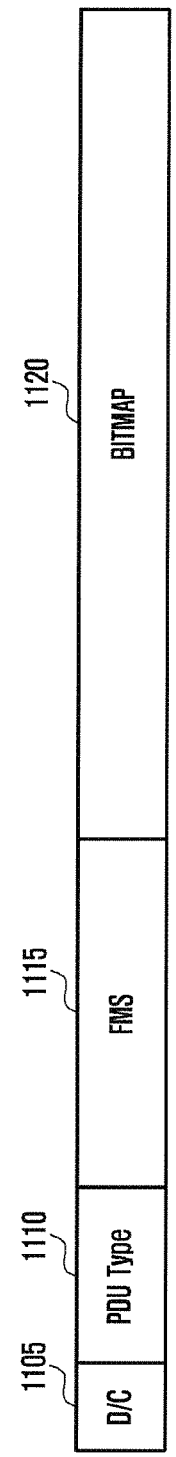
FIG. 11 is a diagram illustrating a format of the PDCP STATUS REPORT according to the third embodiment of the present invention.

FIG. 11 is a diagram illustrating a format of the PDCP STATUS REPORT according to the third embodiment of the present invention.

The PDCP STATUS REPORT is a control message exchanged between the PDCP transmitter and receiver to avoid packet loss in the case that the RLC cannot perform ARQ temporarily due to the reconfiguration of the RLC entity. The PDCP STATUS REPORT includes a D/C field 1105, a PDU type field 1110, an FMS field 1115, and a bitmap field 1120. The D/C field 1105 is 1-byte long and indicates whether the corresponding PDCP PDU is a data PDU or a control PDU. The PDCP STATUS REPORT is a control PDU. The PDU type field 1110 is 3-bit long and indicates the type of the control PDU. The FMS field 1115 is 12-bit or 15-bit long. The FMS recorded at the FMS field 1115 indicates the PDCP SN of the first missing PDCP packet. The bitmap 1120 is variable in length and each bit of the bitmap indicates presence/absence of PDCP packet to receive or necessity of retransmission. The PDCP SN corresponding to each bit of the bitmap is determined depending on the FMS and the position of the corresponding bit on the bitmap. For example, if the FMS is set to 1, the first and second bits indicate the PDCP SN 2 and PDCP SN 3 respectively.

Fourth Embodiment

Only when any SCell is configured or activated to the UE or the SCell is released or deactivated, the UE may reconfigure the Radio Frequency Frontend. This includes the procedure of reconfiguring the RF filter bandwidth in adaptation to the situation in which the SCell is configured or activated newly or released or deactivated, and the data communication is suspended while the UE is reconfiguring the bandwidth. The RF bandwidth reconfiguration is characterized as follows.

If an SCell is configured, activated, released, or deactivated on the same frequency band as the serving cell configured ready (e.g. PCell), the data communication is suspended in the previously configured serving cell (e.g. the PCell) during a predetermined period. For explanation convenience, it is assumed that the previously configured serving cell is the PCell and the suspension of the data communication is referred to as PCell interruption.

The determination on whether PCell interruption has occurred and the length of the PCell interruption period are determined depending on the UE processing capability and hardware performance.

1. If the PCell and SCell are configured on different frequency bands; the RF bandwidth reconfiguration is not necessary, and the PCell interruption does not occur.

2. If the PCell and SCell are configured on the same frequency band, if the UE has at least one RF device (or reception device), and if at least one RF device (or reception device) operates on the frequency band; the RF bandwidth reconfiguration is not necessary, and the PCell interruption does not occurs.

3. If the PCell and SCell are configured on the same frequency band on which only one RF device operates, the RF bandwidth reconfiguration is not necessary, and the PCell interruption occurs.

In the case of performing RF bandwidth reconfiguration due to the SCell activation or deactivation, the PCell interruption occurs before and after performing measurement on the SCell in the inactive state. If the RF device is reconfigured to include all the PCell and SCell in configuring the SCell and configured to include only the PCell in releasing the SCell, the PCell interruption does not occur while the SCell is in configured state.

The present embodiment proposes a scheduling method and apparatus operating in such a way that the UE reports to the eNB whether the PCell interruption is necessary and then the eNB schedules the UE in consideration of whether the PCell interruption has occurred and, if so, the occurrence time.

FIG. 12 is a signal flow diagram illustrating a communication procedure according to the fourth embodiment of the present invention. In FIG. 12, the system includes a UE 1205, an eNB 1210, and an MME 1215. The UE 1205 powers on at step 1220. The UE 1205 searches for the cell of which the electric wave is received and the corresponding PLMN and determines the cell and PLMN to perform the registration procedure based thereon at step 1225.

The UE 1205 sends the MME a control message requesting for registration (ATTACH REQUEST) through the selected cell after the RRC connection setup procedure at step 1230. This message includes the information such as identifier of the UE 1205. Upon receipt of the ATTACH REQUEST message, the MME 1215 determines whether to accept the registration and, if it is determined to accept, sends the serving eNB 1210 a control message (Initial Context Setup Request) at step 1235. If the MME has the UE capability information, it transmits the UE capability information in the control message; however, the MME has no UE capability information in the initial registration procedure and thus the control message includes not UE capability information. If the Initial Context Setup Request message having no UE capability information, the eNB 1210 sends the UE 1205 a control message called UE CAPABILITY ENQUORY to acquire the UE capability information at step 1240. This message is of instructing the UE 1205 to report the UE capability such as Radio Access Technology (RAT) of the UE 1205 using the parameter called RAT type. If the UE 1205 is performing the procedure in the LTE network, the RAT type is set to Evolved Universal Terrestrial Radio Access (EUTRA). The eNB may request for the UMTS-related capability information of the UE 1205 by adding another RAT type of UTRA for preparing handover afterward if there is other radio network, e.g. UMTS network, around. If the UE CAPABILITY ENQUIRY control message is received, the UE generates UE CAPABILITY INFORMATION including its capability information about the radio technology indicated by the RAT type. This control message contains the information on one or more bands combination informations on the bands combinations it supports. The band combination information indicates the CA combinations supported by the UE 1205, and the eNB 1210 configures appropriate CA to the UE 1205 based on this information. The above control message also includes the information indicating whether the PCell interruption is necessary for predetermined band combinations of the UE 1205 (PCell interruption information). The UE 1205 sends the eNB 1210 the UE CAPABILITY INFORMATION message at step 1245. The eNB 1210 sends the MME 1215 a UE CAPABILITY INFO INDICATION message to report the UE capability information included in the UE CAPABILITY INFORMATION message to the MME 1215 at step 1250. The eNB 1210 reconfigures the UE 1205 appropriately in consideration of the traffic status and channel condition of the UE 1205 based on the capability information reported by the UE 1205. For example, the eNB configures additional SCell or measurement gap with the command of instructing measurement on other frequencies at step 1255.

The eNB performs scheduling in the PCell in consideration of the PCell interruption, and the UE 1205 performs RF bandwidth reconfiguration for PCell interruption during a predetermined period at step 1260.

Figure 13:
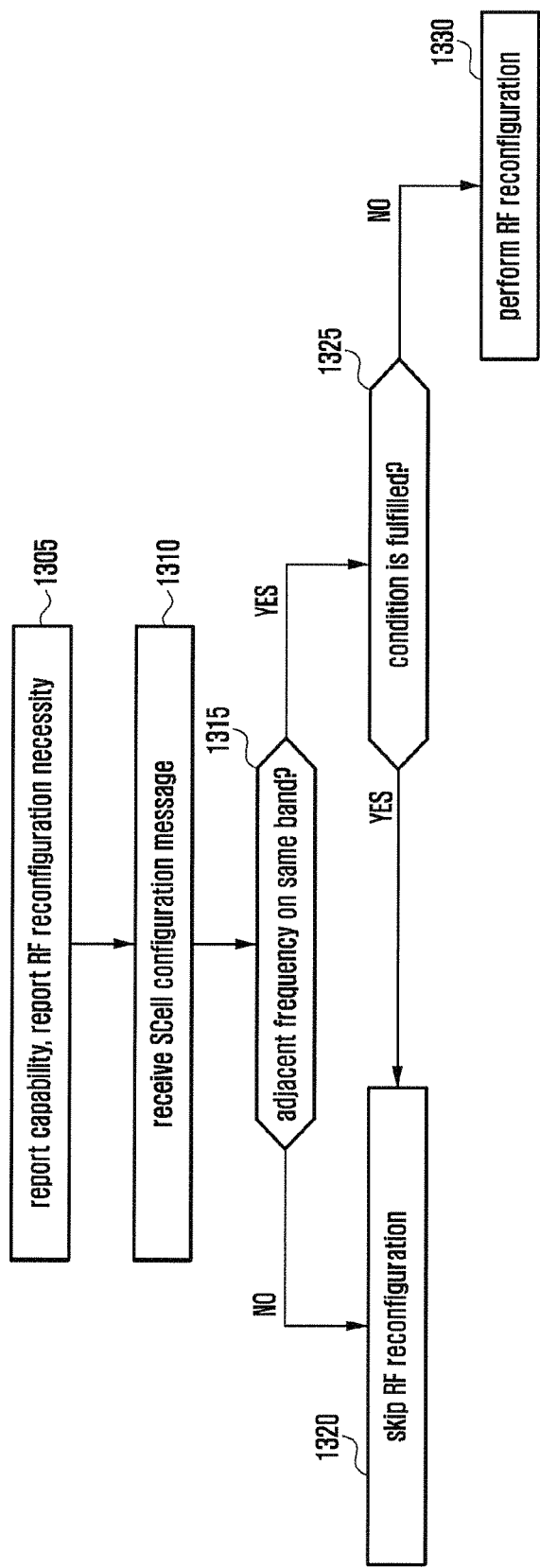
FIG. 13 is a flowchart illustrating the SCell configuration message processing procedure according to the fourth embodiment of the present invention.

FIG. 13 is a flowchart illustrating the SCell configuration message processing procedure according to the fourth embodiment of the present invention.

The UE 1205 reports its capability to the eNB 1210 at step 1305. At this time, the UE 1205 reports the frequency bands it supports and the frequency bands combinations supporting carrier aggregation. The UE capability report message includes 1-bit information indicating whether the PCell interruption is required.

The UE 1205 receives a control message requesting for configuring at least one SCell at step 1310. The UE 1205 determines whether the frequency of the SCell belongs to the same frequency band as the serving cell configured already, e.g. PCell, and is a neighboring frequency at step 1315. If the above condition is not fulfilled, the UE 1205 does not perform the RF bandwidth reconfiguration at step 1320.

If the new SCell is configured on the same frequency band as the PCell and the frequencies of the two serving cells are adjacent to each other, the UE 1205 determines whether at least one of the following conditions is fulfilled at step 1325.

Condition 1: The capability report indicates that PCell interruption is not necessary.

Condition 2: The scellMeasurementCycle or the greatest one between current DRX cycle and the scellMeasurementCycle is less than a predetermined threshold value.

If at least one of the two conditions is fulfilled, the UE 1205 skips RF bandwidth reconfiguration at step 1320.

If both the conditions are not fulfilled, the UE 1205 performs RF bandwidth reconfiguration during a predetermined period at step 1330. The predetermined period is the time period between the subframe (n+x1) and the subframe (n+x1+d). The x1 denotes the time necessary for receiving and interpreting the RRC Connection Reconfiguration message and taking an appropriate action and is set to a value large enough to be applied to the UEs having various capabilities. Here, d denotes the time required for reconfiguring RF bandwidth and may be set to a value large enough to be applied to the UEs having various capabilities.

Figure 14:
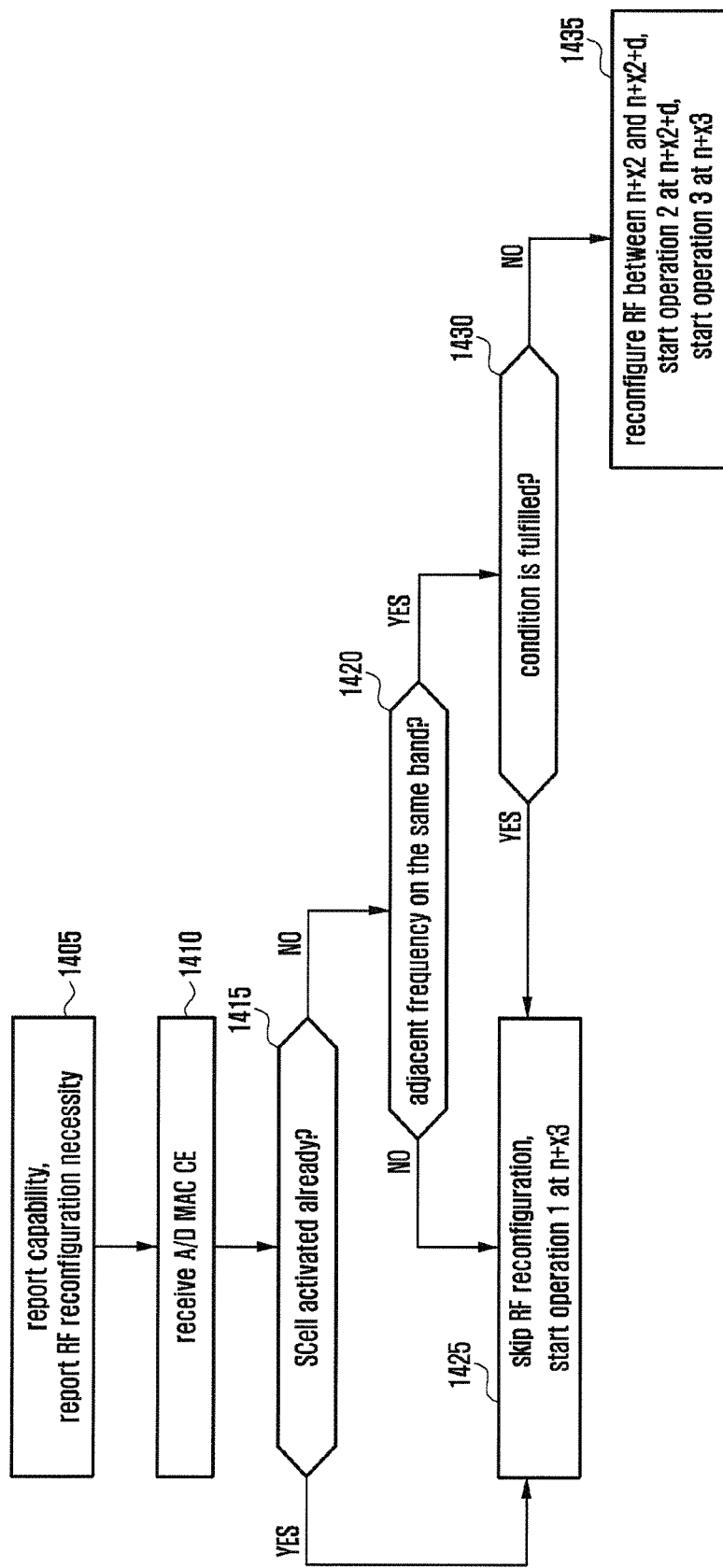
FIG. 14 is a flowchart illustrating the A/C MAC CE message processing procedure of the UE 1205 according to an embodiment of the present invention.
Figure 15:
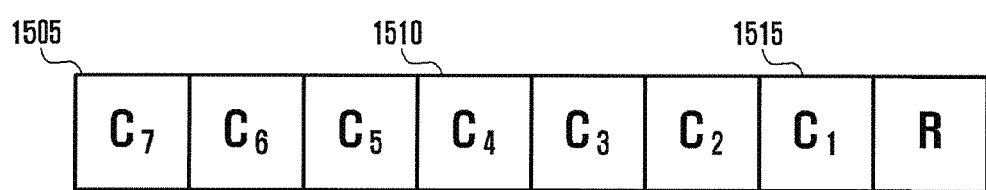
FIG. 15 is a diagram illustrating a format of the payload.

FIG. 14 is a flowchart illustrating the A/C MAC CE message processing procedure of the UE 1205 according to an embodiment of the present invention.

Since steps 1405 is identical with step 1305, detailed description thereof is omitted herein. The UE 1205 receives an Activation/Deactivation MAC CE (A/D MAC CE) in which a bit corresponding to at least one SCell is set to 1. The A/D MAC CE is a MAC layer control message for activating or deactivating the SCells configured to the UE 1205 and includes a MAC sub-header and payload. The MAC sub-header includes a Logical Channel ID (LCID) indicating the type of the payload and an E bit indicating whether another MAC sub-header exists.

FIG. 14 is a flowchart illustrating the A/C MAC CE message processing procedure of the UE 1205 according to an embodiment of the present invention.

The payload is a bitmap of 1 byte of which the $C_7$ bit 1505 indicates the state of the serving cell of which SCell index is 7 (hereinafter, the serving cell of which SCell index is x is referred to as SCell x), the $C_4$ bit 1510 the state of the SCell 4, and the $C_1$ bit 1515 the state of the SCell 1. In the case that the bit corresponding to the SCell x is set to 1, if the SCell x is in the active state already, the UE 1205 maintains the active state and, otherwise if the SCell x is in the inactive state, transitions the SCell state to the active state. In the case that the bit corresponding to the SCell x is set to 0, if the corresponding SCell is in the active state, the UE transitions the SCell state to the inactive state and, otherwise if the corresponding SCell is in the inactive state, maintains the inactive state.

The UE 1205 determines whether the SCell of which corresponding bit is set to 1 is the SCell which has been activated already at step 1415. If the SCell has been already activated, the procedure goes to step 1425 and, otherwise, step 1420. At step 1420, the UE 1205 determines whether the frequency of the SCell belongs to the same frequency band as the serving cell configured already, e.g. PCell, and adjacent to the frequency of the PCell. If the condition is not fulfilled, the procedure goes to step 1425 and, otherwise the condition is fulfilled, step 1430. At step 1425, the UE 1205 starts performing operation 1 at subframe (n+x3) without RF bandwidth reconfiguration. The operation 1 includes the normal actions taken in activating the SCell as follows.

Operation 1
Transmit Sounding Reference Signal (SRS) in active SCell
Transmit Channel Quality Indicator (CQI) for SCell
Monitor PDCCH of SCell
Monitor PDCCH for SCell (SCell scheduling may be performed by the PCell depending on the configuration, and PDCCH monitoring for SCell means that the UE 1205 monitors PDCCH of the PCell to determine whether SCell scheduling is received)
Start sCellDeactivationTimer
Trigger Power Headroom Report (PHR)

If the RF bandwidth reconfiguration is not performed, x3 is set to a period long enough to complete the above operation at the UE 1205, e.g. period corresponding to 8 subframes.

The UE 1205 determines whether at least one of following conditions is fulfilled at step 1430.

Condition 1: The capability report indicates that the PCell interruption is not necessary.

Condition 2: scellMeasurementCycle or the greatest value between the current DRX cycle and scellMeasurementCycle is less than a predetermined threshold value.

If at least one of the two conditions is fulfilled, the procedure goes to step 1425. Otherwise if both the conditions are not fulfilled, the procedure goes to step 1435.

At step 1435, the UE 1205 perform RF bandwidth reconfiguration between n+x2 and n+x2+d. The x2 is set to a value, e.g. 5, in order for the UE 1205 to transmit Hybrid Automatic Repeat Request (HARQ) ACK in correspondence to the A/D MAC CE. The UE 1205 performs operation 2 at the first subframe after n+x2+d. The operation 2 has to be performed directly in the SCell after completion of the RF reconfiguration.

Operation 2
Transmit Sounding Reference Signal (SRS) in the SCell in active state
Monitor PDCCH of SCell
Monitor PDCCH for SCell (SCell scheduling may be performed by the PCell depending on the configuration, and PDCCH monitoring for SCell means that the UE 1205 monitors PDCCH of the PCell to determine whether SCell scheduling is received)

The UE 1205 performs operation 3 at n+x3. The operation 3 is not performed in the SCell directly and includes the actions taken at predetermined timings although the RF reconfiguration has not been completed.

Operation 3
Start sCellDeactivationTimer
Trigger Power Headroom Report (PHR)
Transmit Channel Quality Indicator (CQI) for SCell The sCellDeactivationTimer is of deactivating the SCell having no data to be transmitter/received during a predetermined period and configured per SCell. If the SCell is activated, the UE 1205 starts the timer and restarts the timer whenever downlink assignment or uplink grant for the SCell is received or whenever the SCell is reactivated.

The Power Headroom Report (PHR) is the control information of reporting the current power headroom of the UE 1205 to the eNB 1210. If the SCell is activated, the UE 1205 reports power headroom (PHR) to the eNB 1210 to notify the transmission power status for the SCell.

Figure 16:
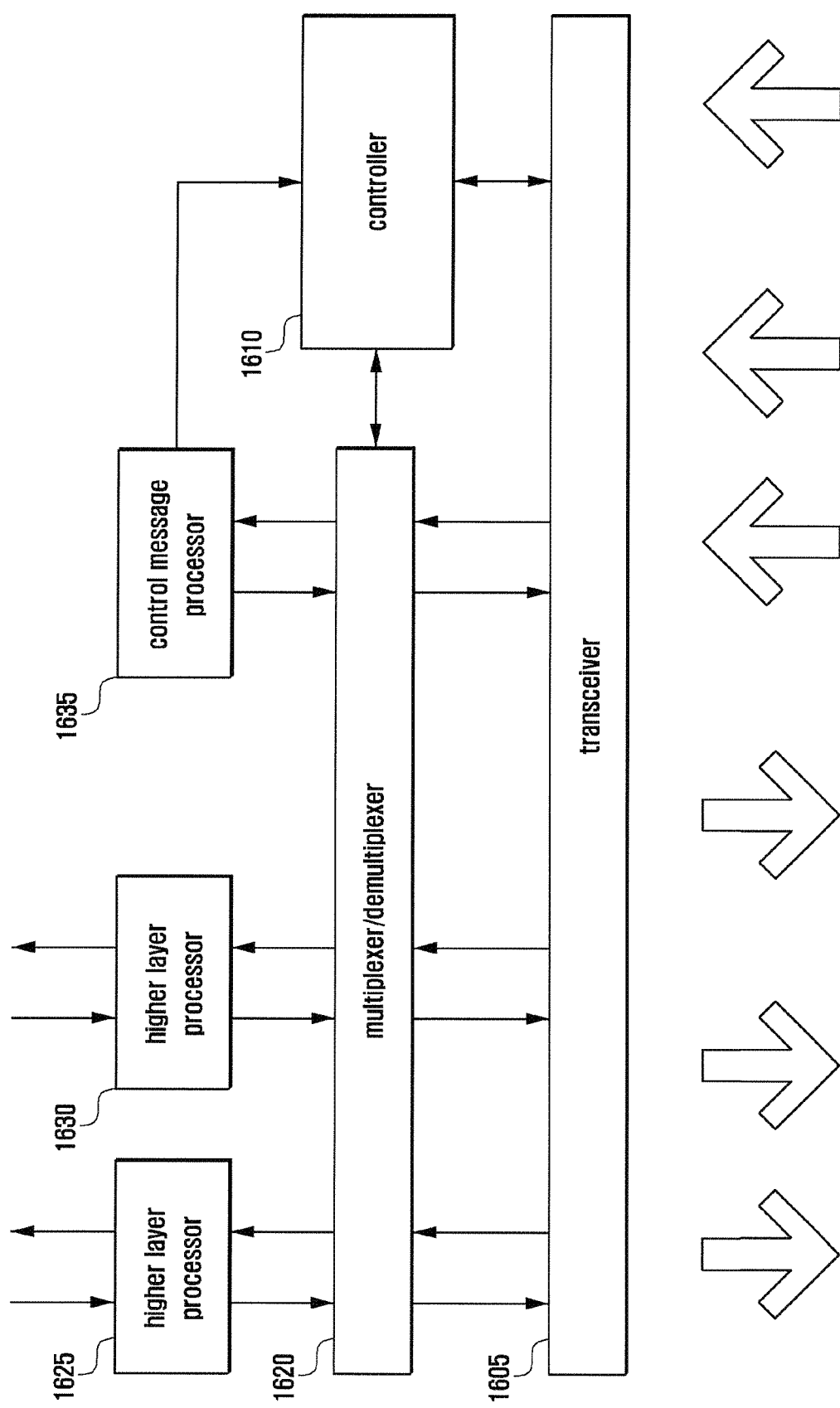
FIG. 16 is a block diagram illustrating a configuration of the UE according to an embodiment of the present invention.

FIG. 16 is a block diagram illustrating a configuration of the UE according to an embodiment of the present invention.

Referring to FIG. 16, the UE according to an embodiment of the present invention includes a transceiver 1605, a controller 1610, a multiplexer/demultiplexer 1620, a control message processor 1635, and various higher layer processors 1625 and 1630.

The transceiver 1605 receives data and predetermined control signals on the downlink channel of the serving cell and transmits data and predetermined control signals on the uplink channel. In the case that a plurality of serving cells is configured, the transceiver 1605 transmits/receives data and control signals through the plural serving cells.

The multiplexer/demultiplexer 1620 multiplexes the data generated by the higher layer processors 1625 and 1630 and the control message processor 1635 and demultiplexes the data received by the transceiver 1605, the demultiplexed data being delivered to the higher layer processors 1625 and 1630 or the control message processor 1635.

The control message processor 1635 is an RRC layer entity which takes an action necessary for processing the control message received from the eNB. For example, the control message processor 1635 processes the received random access-related information and delivers the processing result to the controller.

The higher layer processors 1625 and 1630 are established per service. The higher layer processor processes the data generated by the user service such as File Transfer Protocol (FTP) and Voice over Internet Protocol (VoIP), the processing result being delivered to the multiplexer/demultiplexer 1620, and processes the data from the multiplexer/demultiplexer 1615, the processing result being delivered to the higher layer service application.

The controller 1610 controls the transceiver 1605 and the multiplexer/demultiplexer 1615 to check the scheduling command, e.g. uplink grants, received by the transceiver 1605 and perform uplink transmission using appropriate transmission resource at appropriate timing. The controller controls overall operations related to the SCell configuration, PDCP sequence number processing, and random access congestion control. The controller 1610 may control the components of the UE to perform at least some of the above described embodiments.

Figure 17:
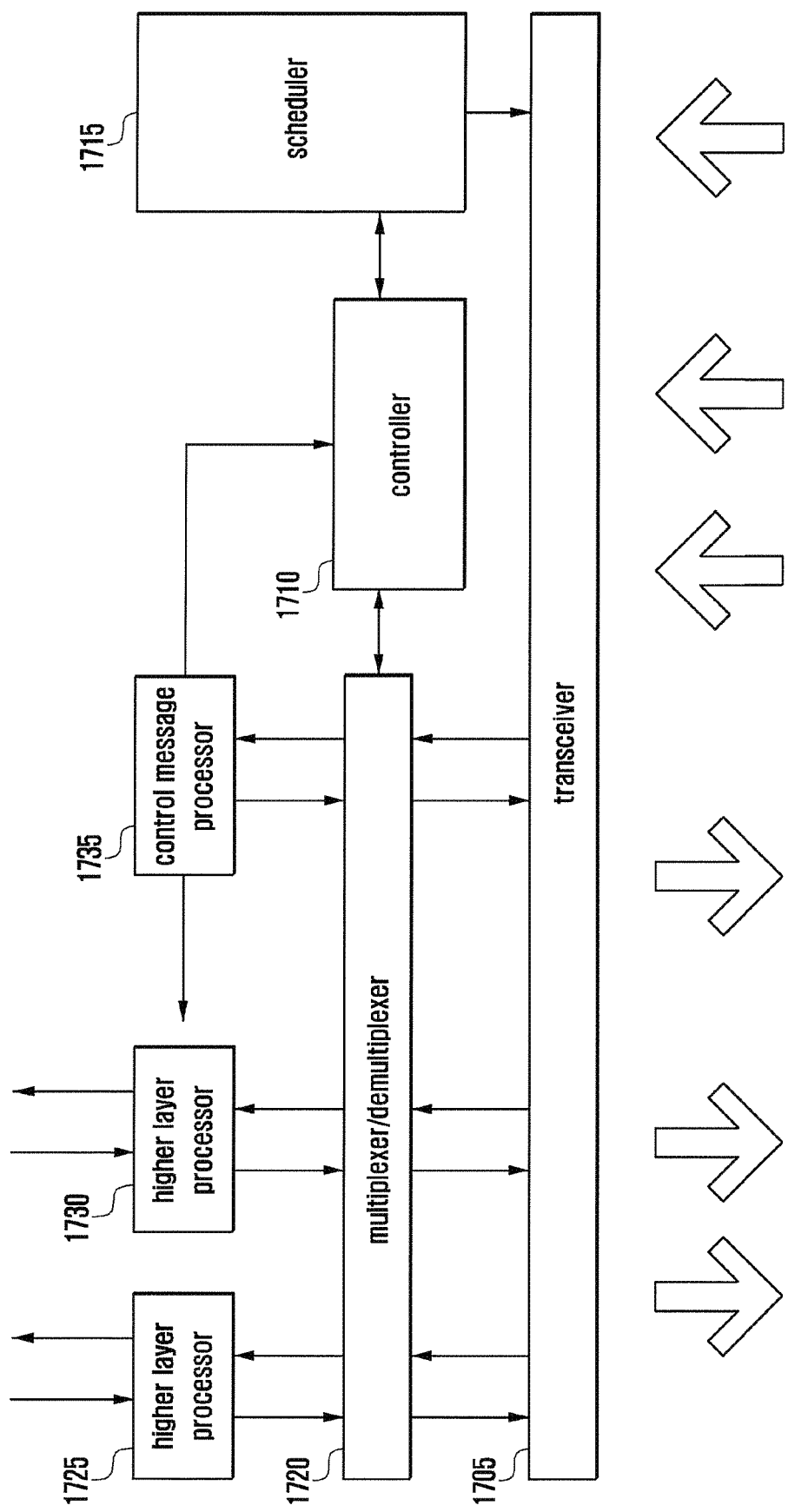
FIG. 17 is a block diagram illustrating a configuration of the eNB according to an embodiment of the present invention.

FIG. 17 is a block diagram illustrating a configuration of the eNB according to an embodiment of the present invention.

Referring to FIG. 17, the eNB includes a transceiver 1705, a controller 1710, a multiplexer/demultiplexer 1720, a control message processor 1735, various higher layer processors 1725 and 1730, and a scheduler 1715.

The transceiver transmits data and predetermined control signals on the downlink channel of the serving cell and receives data and predetermined control signals on the uplink channel. In the case that a plurality of carriers is configured, the transceiver 1705 transmits/receives data and control signals through the plural carriers.

The multiplexer/demultiplexer 1720 is responsible for multiplexing data generated by the higher layer processors 1725 and 1730 and the control message processor 1735 or demultiplexing the data received by the transceiver 1705, the demultiplexed data being delivered to the control message processor 1735 or the controller 1710. The control message processor 1735 processes the control message transmitted by the UE and takes a necessary action or generates a control message to be transmitted to the UE, the generated control message being delivered to the lower layer.

The higher layer processors 1725 and 1730 are established per service and processes the data from the S-GW or other eNB into RLC PDU, the RLC PDU being delivered to the multiplexer/demultiplexer 1720, and processes the RLC PDU from the multiplexer/demultiplexer 1720 into PDCP SDU, the PDCP SDU being transmitted to the S-GW or other eNB.

The scheduler allocates transmission resource to the UE at an appropriate timing in consideration of the UE buffer status and channel status and controls the transceiver to process the signal to be transmitted to the UE and transmit the signal.

The controller 1710 controls overall operations related to the SCell configuration, PDCP sequence number processing, and random access congestion control.

The controller 1710 may control the components of the eNB to perform at least some of the above described embodiments.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Furthermore, the respective block diagrams may illustrate parts of modules, segments or codes including at least one or more executable instructions for performing specific logic function(s). Moreover, it should be noted that the functions of the blocks may be performed in different order in several modifications. For example, two successive blocks may be performed substantially at the same time, or may be performed in reverse order according to their functions.

The term "module" according to the embodiments of the invention, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

It is to be appreciated that those skilled in the art can change or modify the embodiments without departing the technical concept of this invention. Accordingly, it should be understood that above-described embodiments are essentially for illustrative purpose only but not in any way for restriction thereto. Thus the scope of the invention should be determined by the appended claims and their legal equivalents rather than the specification, and various alterations and modifications within the definition and scope of the claims are included in the claims.

Although various embodiments of the present disclosure have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

The invention claimed is:

1. A method by a terminal in a wireless communication, the method comprising:
   communicating with a first base station based on a first packet data convergence protocol sequence number (PDCP SN) size for a first radio bearer, the first radio bearer being configured based on first configuration information;
   receiving, from the first base station, a control message for a handover from the first base station to a second base station, wherein the control message includes an indication to perform full configuration and second configuration information, the second configuration information including information on a second PDCP SN size for a second radio bearer;
   releasing the first radio bearer based on the indication to perform full configuration;
   establishing the second radio bearer for communicating with the second base station, based on the second configuration information; and
   communicating with the second base station based on the second PDCP SN size for the second radio bearer.

2. The method of claim 1, wherein a first PDCP entity for the first radio bearer is released based on the full configuration and a second PDCP entity for the second radio bearer is established based on the second configuration information included in the control message.

3. The method of claim 2, further comprising:
delivering a downlink PDCP packet stored in the first PDCP entity for a reception to an upper layer before the first PDCP entity is released.

4. The method of claim 2, further comprising:
discarding an uplink PDCP packet stored in the first PDCP entity for a transmission before the first PDCP entity is released.

5. The method of claim 2, further comprising:
delivering a downlink RLC packet stored in a first RLC entity to an upper layer before the first RLC entity is released.

6. The method of claim 2, further comprising:
forwarding an uplink PDCP packet to the second PDCP entity,
wherein the uplink PDCP packet includes a first group of PDCP packets that has not been forwarded to a lower layer and a second group of PDCP packets that has been forwarded to the lower layer but successful delivery has not been confirmed.

7. A terminal in a wireless communication, the terminal comprising:
a transceiver; and
at least one processor configured to:
control the transceiver to communicate with a first base station based on a first packet data convergence protocol sequence number (PDCP SN) size for a first radio bearer, the first radio bearer being configured based on first configuration information;
control the transceiver to receive, from the first base station, a control message for a handover from the first base station to a second base station, wherein the control message includes an indication to perform full configuration and second configuration information, the second configuration information including information on a second PDCP SN size for a second radio bearer;
release the first radio bearer based on the indication to perform full configuration;
establish the second radio bearer for communicating with the second base station, based on the second configuration information; and
control the transceiver to communicate with the second base station based on the second PDCP SN size for the second radio bearer.

8. The terminal of claim 7, wherein a first PDCP entity for the first radio bearer is released based on the full configuration and a second PDCP entity for the second radio bearer is established based on the second configuration information included in the control message.

9. The terminal of claim 8, wherein the at least one processor is further configured to deliver a downlink PDCP packet stored in the first PDCP entity for a reception to an upper layer before the first PDCP entity is released.

10. The terminal of claim 8, wherein the at least one processor is further configured to discard an uplink PDCP packet stored in the first PDCP entity for a transmission before the first PDCP entity is released.

11. The terminal of claim 8, wherein the at least one processor is further configured to deliver a downlink RLC packet stored in a first RLC entity to an upper layer before the first RLC entity is released.

12. The terminal of claim 8, wherein the at least one processor is further configured to forward an uplink PDCP packet to the second PDCP entity,
wherein the uplink PDCP packet includes a first group of PDCP packets that has not been forwarded to a lower layer and a second group of PDCP packets that has been forwarded to the lower layer but successful delivery has not been confirmed.

* * * * *